US011442289B2

(12) United States Patent
Rottenberg et al.

(10) Patent No.: US 11,442,289 B2
(45) Date of Patent: Sep. 13, 2022

(54) APPARATUS FOR DISPLAYING A THREE-DIMENSIONAL IMAGE

(71) Applicant: IMEC VZW, Leuven (BE)

(72) Inventors: Xavier Rottenberg, Kessel-Lo (BE); Kristof Lodewijks, Wilsele (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/979,512

(22) PCT Filed: Mar. 4, 2019

(86) PCT No.: PCT/EP2019/055305
§ 371 (c)(1),
(2) Date: Sep. 9, 2020

(87) PCT Pub. No.: WO2019/170598
PCT Pub. Date: Sep. 12, 2019

(65) Prior Publication Data
US 2021/0003859 A1    Jan. 7, 2021

(30) Foreign Application Priority Data
Mar. 9, 2018   (EP) .................................... 18161059

(51) Int. Cl.
*G02B 30/56*       (2020.01)
*H04N 13/388*    (2018.01)

(52) U.S. Cl.
CPC ........... *G02B 30/56* (2020.01); *H04N 13/388* (2018.05)

(58) Field of Classification Search
CPC ...... G02B 30/56; G02B 30/10; H04N 13/388; G03B 21/606; G03B 21/608
See application file for complete search history.

(56) References Cited

U.S. PATENT DOCUMENTS 6,550,167 B2 *   4/2003   Huang ................... G09F 13/24
                                                                       40/406
8,487,836 B1    7/2013   Bodine
(Continued)

FOREIGN PATENT DOCUMENTS

GB    2537158 A    10/2016
JP    4891831 B2    3/2012
(Continued)

OTHER PUBLICATIONS

Sang B H et al, "Pressure-dependent refractive indices of gases by THz time-domain spectroscopy", Optics Express, vol. 24, No. 25, Dec. 12, 2016, pp. 29040-29047.
(Continued)

*Primary Examiner* — Jade R Chwasz
(74) *Attorney, Agent, or Firm* — Moser Taboada

(57) ABSTRACT

An apparatus for displaying a three-dimensional image comprises: a light field generating unit (110), which is configured to receive an incident light beam (112) and generate a three-dimensional light field; and an image revealing medium (120), which is arranged to receive the three-dimensional light field generated by the light field generating unit (110), wherein the image revealing medium (120) comprises a fluid with bubbles or particles suspended in the fluid, wherein the bubbles or particles have a size in the range of 40-500 nm.

17 Claims, 8 Drawing Sheets

(56) References Cited

U.S. PATENT DOCUMENTS

| | | | |
|---|---|---|---|
| 8,807,777 B2* | 8/2014 | Watanabe | G09F 9/30 |
| | | | 362/101 |
| 9,829,612 B1 | 11/2017 | Koudsi et al. | |
| 2004/0227694 A1* | 11/2004 | Sun | H04N 13/39 |
| | | | 345/6 |
| 2010/0321478 A1 | 12/2010 | Sliwa et al. | |
| 2012/0090005 A1 | 4/2012 | Marlow et al. | |
| 2012/0128749 A1 | 5/2012 | Tsuji et al. | |
| 2013/0063438 A1 | 3/2013 | Billett et al. | |
| 2017/0013251 A1 | 1/2017 | Thigpen | |
| 2017/0189943 A1 | 7/2017 | Murata et al. | |

FOREIGN PATENT DOCUMENTS

| | | |
|---|---|---|
| JP | 2013092582 A | 5/2013 |
| WO | WO-2004053589 A1 | 6/2004 |
| WO | WO-2014178511 A1 | 11/2014 |

OTHER PUBLICATIONS

ISO 20480-1:2017.

International Search Report in PCT/EP2019/055305 dated Jul. 31, 2019.

Malvern Panalytical, "Those bubbles are ultra-fine!", https://www.materials-talks.com/blog/2014/11/05/those-bubbles-are-ultra-fine/, accessed on Aug. 27, 2020.

Wikipedia: "Tyndall effect", https://en.wikipedia.org/wiki/Tyndall_effect, accessed on Aug. 27, 2020.

Acniti LLC: "Different Bubbles sizes and why it matters to the properties", https://www.acniti.com/technology/different-bubbles-sizes-and-why-it-matters-to-the-properties/, accessed on Aug. 27, 2020.

"What are Ultrafine Bubbles?"; Downloaded from website The Wayback Machine—https://web.archive.org/web/20141109124853/http://idec.com:80/home/finebubble/bubble01.html on May 25, 2022; archived on Nov. 9, 2014; 3 pages.

* cited by examiner

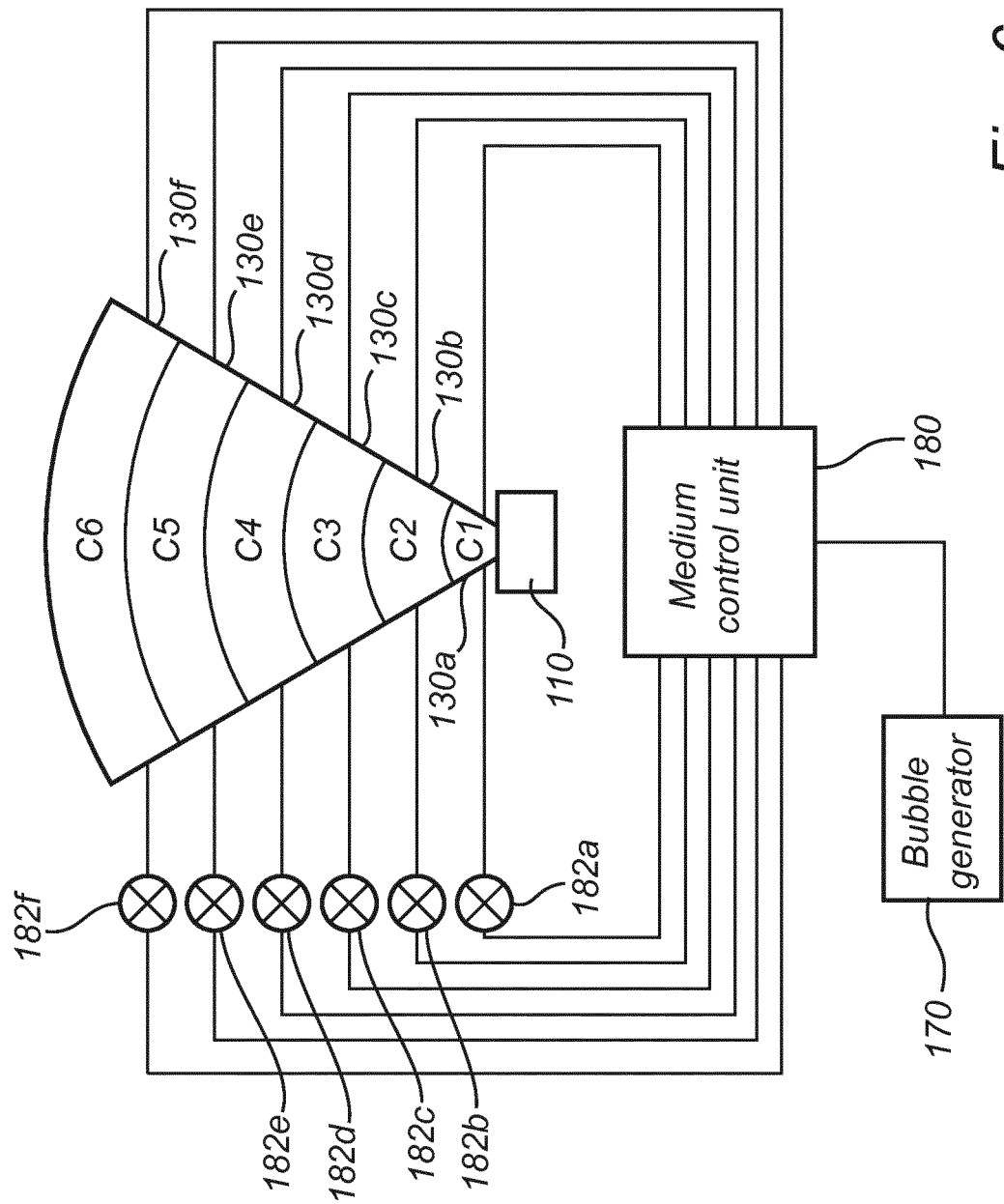

APPARATUS FOR DISPLAYING A THREE-DIMENSIONAL IMAGE

TECHNICAL FIELD

The present inventive concept relates to an apparatus for displaying a three-dimensional image. In particular, the present inventive concept relates to an apparatus for forming an image based on a projected three-dimensional light field.

BACKGROUND

Three-dimensional displays may be implemented in many different manners. In some implementations, the three-dimensional display may comprise a distribution of light sources. This implies that complex hardware may be necessary in order to control the sources for forming the three-dimensional display.

However, in another implementation, a holographic image may be formed by a three-dimensional control of a light field. Thus, a projection of a light field may be formed into a three-dimensional space. Then, in order to create an image that may be seen by an observer, the three-dimensional light field may need to propagate through a medium where the light is scattered. A scattering point forms an origin of light, such that the scattering points may form an image that may be seen based on the three-dimensional light field.

In US 2010/0321478 volumetric three-dimensional graphical or computer displays are disclosed allowing for an unaided observer to observe static or moving objects from multiple perspectives with natural depth-cues and superior image quality. The display utilizes moving-screens formed from particulate-arrays, wherein multiple images are optically projected on each flying-screen as it passes through the image-volume, thereby minimizing particulate mass-flow since only one screen per image-volume is needed to present the several or many necessary slices of each volumetric frame.

However, it is relatively complex to control the medium which is used for generating the three-dimensional image and it would be desired to facilitate control of the medium so as to enable a practically working three-dimensional display.

SUMMARY

An objective of the present inventive concept is to provide a three-dimensional display which may be practically workable and which would not require constant and meticulous control of a medium which is used for generating the three-dimensional image.

This and other objectives of the invention are at least partly met by the invention as defined in the independent claims. Preferred embodiments are set out in the dependent claims.

According to a first aspect, there is provided an apparatus for displaying a three-dimensional image, said apparatus comprising: a light field generating unit, which is configured to receive an incident light beam and generate a three-dimensional light field; and an image revealing medium, which is arranged to receive the three-dimensional light field generated by the light field generating unit, wherein the image revealing medium comprises a fluid with bubbles or particles suspended in the fluid, wherein the bubbles or particles have a size in the range of 40-500 nm.

The image revealing medium receiving the three-dimensional field is configured to scatter incident light. Thus, each scattering point may form a point of origin of light such that an observer may be able to see a three-dimensional image formed by the scattering of light of the three-dimensional light field. The three-dimensional light field may control an intensity of light being scattered from each portion of the image revealing medium so as to control the three-dimensional image being formed, whereas the image revealing medium may ensure that an observable three-dimensional image is formed.

Having a desired distribution of the bubbles or particles in the image revealing medium ensures that the image revealing medium properly forms the observable three-dimensional image based on the received three-dimensional light field.

Thanks to the selection of size of the bubbles or particles according to the present inventive concept, the bubbles or particles may exhibit neutral buoyancy. This implies that a net effect of movements of bubbles or particles in the image revealing medium will be insubstantial or close to zero. Thus, a distribution of bubbles or particles within the image revealing medium may remain constant or fairly constant over a long period of time.

It is realized that the bubbles or particles may be provided with a negative surface charge, which will help to have a uniform bubble or particle distribution (for sufficiently high concentrations), which is stable over a long period of time within the medium due to repelling Coulomb force between bubbles or particles with the same charge. This effect will result in a fairly constant distribution of the bubbles or particles in the fluid with a quite uniform average distance between bubbles or particles that promotes uniformity of the scattering effect within the image revealing medium.

It is therefore an insight of the invention that, by selecting the size of the bubbles or particles to be in the range of 40-500 nm, stable distribution of bubbles or particles within the image revealing medium may enable a long-term stability of the image revealing medium. Thus, the image revealing medium may be used over a long period of time for forming a three-dimensional image or a sequence of three-dimensional images, such as a three-dimensional video.

Further, for an image revealing medium comprising bubbles suspended in the fluid, bubbles of a size in the range of 40-500 nm may ensure that the bubbles have a long-term stability. It is realized that larger size bubbles in millimeter range may rapidly rise to a surface of a medium and then burst when reaching the surface and larger size bubbles in micrometer range tend to decrease in size and disappear in the fluid. Thus, by selecting the size of the bubbles to be in the range of 40-500 nm, it may be ensured that the bubbles have a long-term stability in not decreasing or increasing in size so as to be maintained as bubbles suspended in the fluid.

The bubbles or particles suspended in the fluid may cause scattering of light based on Tyndall scattering and/or Rayleigh scattering, which both provide a light scattering mechanism based on a relation of wavelength of light and size of the bubbles/particles. For sizes of bubbles/particles far smaller than a wavelength of light, Rayleigh scattering may occur, whereas for sizes of bubbles/particles smaller and around a size of the wavelength of light, Tyndall scattering may occur.

Making use of Rayleigh scattering and/or Tyndall scattering may allow forming an image revealing medium with bubbles or particles arranged in the fluid with an appropriate concentration so that sufficiently strong intensities of scattered light may be provided in order for the formed three-dimensional image to be clearly visible while attenuation of light being propagated through the image revealing medium is not too high so as to enable light reaching all parts of the image revealing medium for forming the image from a large volume of the image revealing medium.

A choice of concentration of bubbles or particles in the image revealing medium may be based on ensuring that each part of the image revealing medium forming a smallest discernible detail of the three-dimensional image, a voxel, has a uniform scattering effect based on comprising a plurality of bubbles or particles. Further, a choice of concentration of bubbles or particles may be based on ensuring that attenuation of light propagating through the image revealing medium is not too high. Thanks to the selection of size of the bubbles or particles according to the present inventive concept, it may also be ensured that an appropriate concentration of bubbles or particles within the image revealing medium may be used.

The use of bubbles or particles of a size of at least 40 nm may be advantageous in that it may in practice be very difficult to generate bubbles or particles of a smaller size while having a uniform size of the bubbles or particles. Thus, the size of the bubbles or particles may facilitate that reliable generation of sizes of bubbles or particles may be provided.

The use of bubbles or particles of a size no larger than 500 nm may be advantageous in that separation between two scattering points may not be too large, such that a homogeneous scattering effect with a high resolution may be provided so as to form a high quality three-dimensional image.

The bubbles or particles may generally be of a spherical shape. In particular for bubbles in the size range of 40-500 nm, the bubbles may generally form a shape with a maximized surface area which implies that the bubbles may be spherically shaped. The size of a spherically shaped bubble or particle should be understood as corresponding to the diameter of the sphere. Thus, according to an embodiment, the bubbles or particles have a diameter in the range of 40-500 nm.

However, it should be realized that the bubbles or particles may not necessarily be exactly spherically shaped. The size of a bubble or particle may then be understood as a largest cross-sectional dimension of the bubble or particle.

An irregularly shaped bubble or particle may have an equivalent spherical diameter being the diameter of a sphere having equivalent volume with the irregularly shaped bubble or particle. The size of a bubble or particle may then be understood as the equivalent spherical diameter of an irregularly shaped bubble or particle.

Further, it should be realized that, although the present inventive concept may provide a distribution of bubbles or particles within the image revealing medium remaining constant or fairly constant over a long period of time, the distribution need not be necessarily homogeneous throughout the image revealing medium. As will be further elaborated on below, the size of bubbles or particles may differ between different parts of the image revealing medium and the concentration of bubbles or particles may also differ between different parts of the image revealing medium.

As used herein, the term "light field generating unit" should be construed as any unit which may form a three-dimensional distribution of light based on an incident light beam. The light field generating unit may be configured to reflect the incident light beam or transmit the incident light beam.

The light field generating unit may comprise a plurality of cells, wherein each cell may be configured to interact with a portion of an incident light beam in order to provide interaction with the portion of the incident light beam. In combination, the interaction between portions of the incident light beam with the plurality of cells may form a three-dimensional light field. The cells may be controllable, such that interaction with light may be changed, which may enable dynamically control a distribution of the three-dimensional light field and, hence, dynamically control a three-dimensional image to be displayed. However, it should be realized that the plurality of cells may provide a static interaction with the incident light beam so that the apparatus will be adapted for display of a particular, static three-dimensional image.

According to an embodiment, the bubbles or particles have a size in the range of 40-200 nm.

The use of bubbles or particles of a size no larger than 200 nm may be advantageous in that a relative scattering cross section may be relatively low, e.g. when using air bubbles in water, such that scattering losses through the image revealing medium are relatively low. This implies that light may propagate through the image revealing medium so as to enable light reaching all parts of the image revealing medium for forming the image from a large volume of the image revealing medium. Further, the separation between two scattering points may not be too large, such that a homogeneous scattering effect with a high resolution may be provided so as to form a high quality three-dimensional image.

According to an embodiment, the bubbles or particles have a size in the range of 50-150 nm.

The use of bubbles or particles of a size no larger than 150 nm is even more advantageous in ensuring that scattering losses through the image revealing medium are low and that separation between two scattering points is small, such that a homogeneous scattering effect with a high resolution may be provided.

The use of bubbles or particles of a size of at least 50 nm may be advantageous in that it may further facilitate that reliable generation of sizes of bubbles or particles may be provided.

According to an embodiment, the fluid is an aqueous liquid. This implies that a non-hazardous liquid may be used, which simplifies handling of the image revealing medium. This may be especially advantageous in that image revealing medium being removed from the apparatus, e.g. in replacing the image revealing medium, may be easily disposed of.

A difference in refractive index between an aqueous liquid and a substantially transparent gas may provide suitable levels of scattering such that the image revealing medium may allow suitable intensity of light to be scattered in order for an image to be observed while allowing light to propagate through the image revealing medium to enable light reaching all parts of the image revealing medium for forming the image from a large volume of the image revealing medium.

It should be realized that a corresponding relation in refractive index between an aqueous liquid and particles may be provided by selecting an appropriate plastic material for forming the particles, e.g. a polystyrene material. However, contrary to the relation in refractive index between an aqueous liquid and a transparent gas, the refractive index of the polystyrene particle may be larger than the refractive index of the aqueous liquid.

According to an embodiment, the bubbles are filled with air or another gas comprising oxygen, nitrogen and/or carbon dioxide. This also implies that substances used in the bubbles are non-hazardous, which simplifies handling of the image revealing medium and generation of the bubbles.

According to an embodiment, a size of the bubbles or particles and a concentration of bubbles or particles in the fluid are selected for providing an optical attenuation constant in the range of 10-200 dB/m for a wavelength of light of the light beam.

The selecting of a size of the bubbles or particles may control a scattering effect of the bubbles or particles, as the scattering cross section is dependent on the size of the bubbles or particles.

The selecting of the concentration of the bubbles or particles also controls optical attenuation in the image revealing medium as a number of scattering points per volume unit of the image revealing medium is changed.

The optical attenuation constant of the image revealing medium may define an amount of light propagating entirely through a volume of the image revealing medium. The optical attenuation constant may be selected such that a large amount of light is scattered by the image revealing medium (to have sufficient intensity of light in forming the three-dimensional image) while still a significant amount of light is allowed to pass entirely through the image revealing medium (such that parts of the image revealing medium being farthest away from an incident light beam may receive sufficient intensity of light so as to contribute to scattering an observable intensity of light in forming of the three-dimensional image). Thus, it may be suitable that a scattering attenuation is set so as to allow between 10% and 1% of an intensity of an incident light beam to propagate through an entire volume of the image revealing medium. This may allow the image revealing medium to scatter sufficient intensities of light while allowing the entire volume of the image revealing medium to receive sufficient intensities of light.

Further, it may be desired that the volume of the image revealing medium is relatively large so as to allow forming of a relatively large three-dimensional image. For instance, a side of a cube of the volume of the image revealing medium may have a size in a range of 0.1-1 m. In order to have a large volume of the image revealing medium while allowing an appropriate scattering attenuation of light, it may thus be desired to have an optical attenuation constant in the range of 10-200 dB/m.

Hence, the size of the bubbles or particles and the concentration of bubbles or particles in the fluid may be selected so as to ensure that the optical attenuation constant is set to be in the range of 10-200 dB/m.

According to an embodiment, a size of the bubbles or particles and a concentration of bubbles or particles in the fluid are selected for providing an average distance between two adjacent bubbles or particles in the fluid below 200 µm.

As mentioned above, the size of the bubbles or particles and the concentration of the bubbles or particles may be selected in order to control the optical attenuation constant of the image revealing medium and to ensure that the optical attenuation constant is appropriate for allowing an appropriate size of the volume of the image revealing medium to be used in forming of the three-dimensional image.

However, the selection of the concentration of bubbles or particles may also need to take into account that sufficient numbers of bubbles or particles should be available within a smallest discernible unit of the image revealing medium such that each voxel will provide a reliable scattering of light. Thus, for each voxel, the image revealing medium should comprise a plurality of scattering points, i.e. bubbles or particles, such that light of sufficient intensity will be reliably scattered from each voxel.

A size of a voxel may be set by the desired resolution of the apparatus. However, for a large size display (e.g. having a 1×1×1 m dimension of the image revealing medium), a high quality image may typically require that a side of a cubic voxel has a size of 1 mm. Thus, it may be desired that a plurality of scattering points may fit into a voxel having a side of 1 mm. It should also be realized that for smaller size displays, e.g. having a 0.1×0.1×0.1 m dimension of the image revealing medium, it may be desired that a side of a cubic voxel is much smaller. For instance, a side of a cubic voxel may have a size of 100 µm. Thus, it may be desired that a plurality of scattering points may fit into a voxel having a side of 100 µm, such that concentration of scattering points is increased with regard to the large size display example above. However, since the total volume of the image revealing medium is smaller, the increased optical attenuation constant due to an increased concentration of scattering points may not cause a problem in light of the three-dimensional light field propagating through the entire volume of the image revealing medium.

Therefore, in order to obtain an appropriate resolution in forming of the three-dimensional image, the image revealing medium may in some embodiments be selected to have an average distance between adjacent bubbles or particles in the image revealing medium below 200 µm. In other embodiments, the image revealing medium may be selected to have an average distance between adjacent bubbles or particles in the image revealing medium below 30 µm.

According to an embodiment, a concentration of bubbles in the fluid is larger than $2*10^{14}$ bubbles/m$^3$. Such a concentration of bubbles in the fluid, especially in an aqueous liquid, may provide an anti-bacterial function in the image revealing medium. This may imply that bacterial growth does not occur or is substantially reduced in the image revealing medium, which may be particularly advantageous as the image revealing medium may be maintained in the apparatus for long-term use. Thus, there is a low risk of presence of bacteria in the image revealing medium, which may simplify handling of the image revealing medium when the image revealing medium is being replaced in the apparatus.

According to an embodiment, the apparatus further comprises a container in which the image revealing medium is arranged, wherein at least a portion of a wall of the container is transparent for output of light scattered by the bubbles or particles in the fluid.

The container may provide a well-defined space in which the image revealing medium may be arranged. Thus, the image revealing medium may be maintained within the container for forming a volume which is used in generating a three-dimensional image.

The container may advantageously comprise a transparent wall so as to allow light to be transmitted through the container wall and reach an observer. A portion of the wall the container may be transparent in order to allow a three-dimensional image formed in the image revealing medium to be observed from a specific direction. However, the entire wall(s) of the container may be transparent in order to allow the three-dimensional image to be observed from all directions.

According to an embodiment, the container may be arranged in relation to the light field generating unit so as to receive light into the image revealing medium. For instance, the container may be formed on a common substrate in which the light field generating unit is formed, e.g. arranged above a light field generating unit for receiving light through a bottom surface of the container.

The apparatus may comprise one or more optical components, such as one or more lenses, between the light field generating unit and the container for controlling the distribution of the three-dimensional light field in the image revealing medium in the container. Such an optical component may form part of a wall of the container for guiding light into the image revealing medium.

According to an embodiment, the apparatus further comprises at least one channel connected to the container for transporting the image revealing medium into and out of the container.

This facilitates replacing of image revealing medium in the container at regular intervals. Thus, when quality of the image revealing medium deteriorates, such as the size and or concentration of bubbles changing in the image revealing medium, the image revealing medium may be transported out of the container through the channel and be replaced by a new image revealing medium with desired characteristics.

The at least one channel may ensure that the replacing of the image revealing medium may be easily performed without requiring any disassembly of parts of the apparatus.

Although the image revealing medium may be provided with a long-term stability, it may still need to be replaced at regular intervals, such as once a day, once a week or once a month, in order to maintain a desired quality of characteristics of the image revealing medium.

According to an embodiment, the image revealing medium is arranged in the container to have an increasing concentration of bubbles or particles in a direction of propagation of light of the generated light field in the container.

As light is scattered while being propagated through the image revealing medium, the intensity of light attenuates along the direction of propagation of light. This implies that the light intensity received by a part of the volume of the image revealing medium will decrease along the direction of propagation of light and, hence, that an intensity of scattered light may decrease. By having an increasing concentration of bubbles or particles along the propagation of the light, the effect of decreasing intensity of scattered light may at least partly be counteracted. This may allow the three-dimensional image to be formed with relatively homogeneous intensity of light in all parts of the three-dimensional image.

Additionally or alternatively, the image revealing medium is arranged in the container to have an increasing size of the bubbles or particles suspended in the fluid along a direction of propagation of light of the generated light field in the container. As scattering intensity may increase with an increased size of the bubbles or particles, this may also counteract an effect of decreasing intensity of scattered light along the direction of propagation of light in the image revealing medium.

According to yet another embodiment, the image revealing medium is arranged in the container to have a combination of an increasing concentration of bubbles or particles and an increasing size of the bubbles or particles suspended in the fluid along a direction of propagation of light of the generated light field in the container.

The concentration of bubbles or particles and the size of the bubbles or particles may thus be used in combination in order to allow the three-dimensional image to be formed with relatively homogeneous intensity of light in all parts of the three-dimensional image.

With different concentration or sizes of bubbles or particles within the revealing medium, the bubbles or particles may tend to rearrange such that a constant concentration and random size distribution is achieved after a certain time.

According to an embodiment, the container may comprise transparent partition walls in order to separate between different parts of the image revealing medium having different characteristics (concentration of bubbles or particles and/or size of bubbles or particles). The transparent partition walls may be very thin and formed from a material having the same or at least a similar refractive index as the fluid of the image revealing medium so as to minimally affect propagation of light in the container. Hence, the transparent partition walls may ensure that different concentration and/or sizes of bubbles or particles is maintained within the image revealing medium over a long period of time.

Alternatively or additionally, the container may comprise a plurality of channels allowing fluids with different characteristics to be introduced in different parts of the container such that the image revealing medium may, at least for a brief period of time, have differing characteristics along a direction of propagation of light. The plurality of channels may be used to continuously, or when needed, introduce desired concentrations of bubbles or particles of desired size at respective parts of the container so as to maintain different concentration and/or sizes of bubbles or particles in different parts of the image revealing medium.

According to an embodiment, the apparatus further comprises at least one calibration sensor, which is configured to receive light being transmitted through the image revealing medium for detecting an intensity of received light as a measure of attenuation of a light beam propagating through the image revealing medium.

The calibration sensor may be used when the image revealing medium in the apparatus is replaced in order to determine attenuation of light of the new image revealing medium. A result of the calibration sensor may be used in setting an intensity of light to be received by the image revealing medium.

The calibration sensor may also be used in order to determine attenuation of the image revealing medium so as to enable detecting if characteristics of the image revealing medium has changed (e.g. if concentration of bubbles has decreased) such that a need of replacing the image revealing medium may be identified.

In case the container comprises partition walls for arranging the image revealing medium in a plurality of compartments, each compartment may be associated with a respective calibration sensor. Thus, a result from the calibration sensor for each compartment may be used as input for setting an intensity of light to be received by the image revealing medium and/or to control that desired characteristics of each compartment are provided, e.g. that a desired attenuation of light of the image revealing medium in each compartment is provided (such that the image revealing medium in a compartment may be replaced if non-desired characteristics are identified).

According to an embodiment, the apparatus further comprises an optical system for transferring the light field generated by the light field generating unit into the image revealing medium.

The optical system may guide light from the light field generating unit into the image revealing medium. This may imply that requirements of a specific geometric relation between the light field generating unit and the image revealing medium may be softened by use of an optical system to guide the light.

Further, the optical system may comprise one or more components for controlling the light field, such as one or more lenses and/or aperture stops for controlling the three-dimensional light field formed in the image revealing medium.

According to an embodiment, the apparatus further comprises a controller unit for controlling the light field generating unit for controlling distribution of light in the three-dimensional light field output by the light field generating unit.

This implies that the light field generating unit may be controlled such that the distribution of light in the three-dimensional light field may be dynamically changed. For instance, the light field generating unit may comprise an array of unit cells, wherein an optical property of each unit cell is individually controllable. Thus, by controlling optical properties of the unit cells, a distribution of a three-dimensional light field formed by the combined interaction between an incident light and the light field generating unit may be controlled.

The controller may thus control and vary the distribution of light in the three-dimensional light field output by the light field generating unit and hence the three-dimensional image being formed by the apparatus. This may be used in order to allow the apparatus to display a changing three-dimensional image, such as allowing the apparatus to display a three-dimensional video.

According to an embodiment, the apparatus further comprises at least one light source, which is configured to generate the light beam incident on the light field generating unit.

This implies that the apparatus may comprise all parts for forming a three-dimensional display: a light source providing a light beam, a light field generating unit for converting the light beam to a distribution of a three-dimensional light field and the image revealing medium for forming a three-dimensional image that may be seen by an observer. Thus, the apparatus may be packaged for having a proper relationship between the light source and the light field generating unit such that the apparatus may easily be taken into use. Also, the apparatus comprising the light source may allow a complete system of a three-dimensional display to be provided in a compact manner.

However, it should be realized that the apparatus may be delivered and sold without including a light source. A user desiring to put the apparatus into use may then combine the apparatus with a light source which may be separately purchased.

The light source may be arranged to form a coherent light beam, such as a laser beam. This may provide accurate control of the three-dimensional light field formed by the light field generating unit.

According to a second aspect of the present inventive concept, there is provided an apparatus for displaying a three-dimensional image, said apparatus comprising: a light field generating unit, which is configured to receive an incident light beam and generate a three-dimensional light field; and a bubble generating device, which is configured to generate bubbles in an image revealing medium for forming an image revealing medium comprising a fluid with bubbles suspended in the fluid, wherein the bubbles have a size in the range of 40-500 nm.

Effects and features of this second aspect are largely analogous to those described above in connection with the first aspect. Embodiments mentioned in relation to the first aspect are largely compatible with the second aspect.

Thus, according to the second aspect, an apparatus for displaying a three-dimensional image may comprise a bubble generating device, such that an image revealing medium with an appropriate size of bubbles may be formed by the apparatus. This implies that the apparatus may be able to generate bubbles of appropriate size such that the image revealing medium may be generated when the device is to be taken into use or at regular intervals when the image revealing medium may need to be replaced.

It should be realized that even though the image revealing medium may have a long-term stability, it may need to be replaced at regular intervals in order to maintain quality of generated three-dimensional images. For instance, the image revealing medium may need to be replaced once a day, once a week, or once a month depending on requirement of quality of the three-dimensional images being formed.

Thanks to the apparatus having a bubble generating device, the apparatus need not be combined with any advanced or complex equipment in order to enable replacing of the image revealing medium.

Further, the apparatus may comprise a container in which the image revealing medium is to be received, such that the bubble generating device may be configured to generate bubbles into an image revealing medium which is transported into the container. The apparatus may further be configured such that the three-dimensional light field is received by the image revealing medium in the container so that a three-dimensional image may be formed by the image revealing medium based on the received three-dimensional light field.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 6 is a schematic view of control of the image revealing medium in an apparatus comprising a container with a plurality of compartments according to a second embodiment.

DETAILED DESCRIPTION

Figure 1:
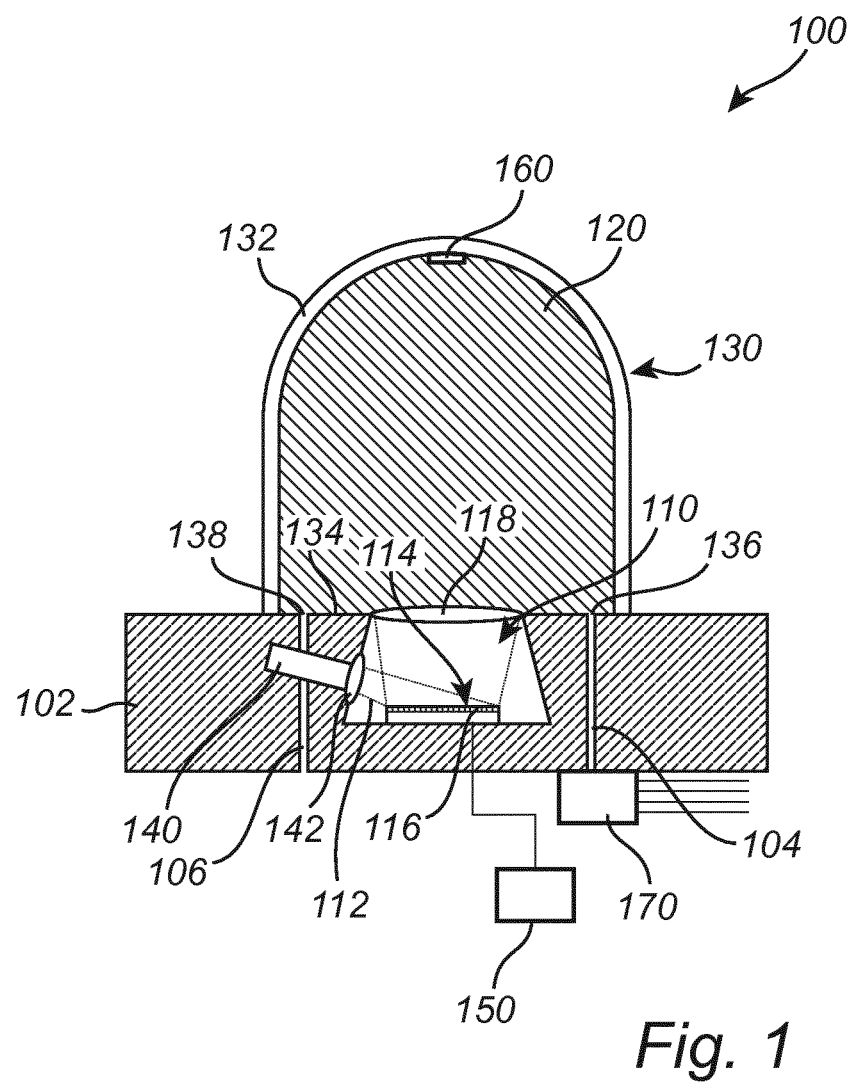
FIG. 1 is a schematic view of an apparatus according to an embodiment.
Figure 2A:
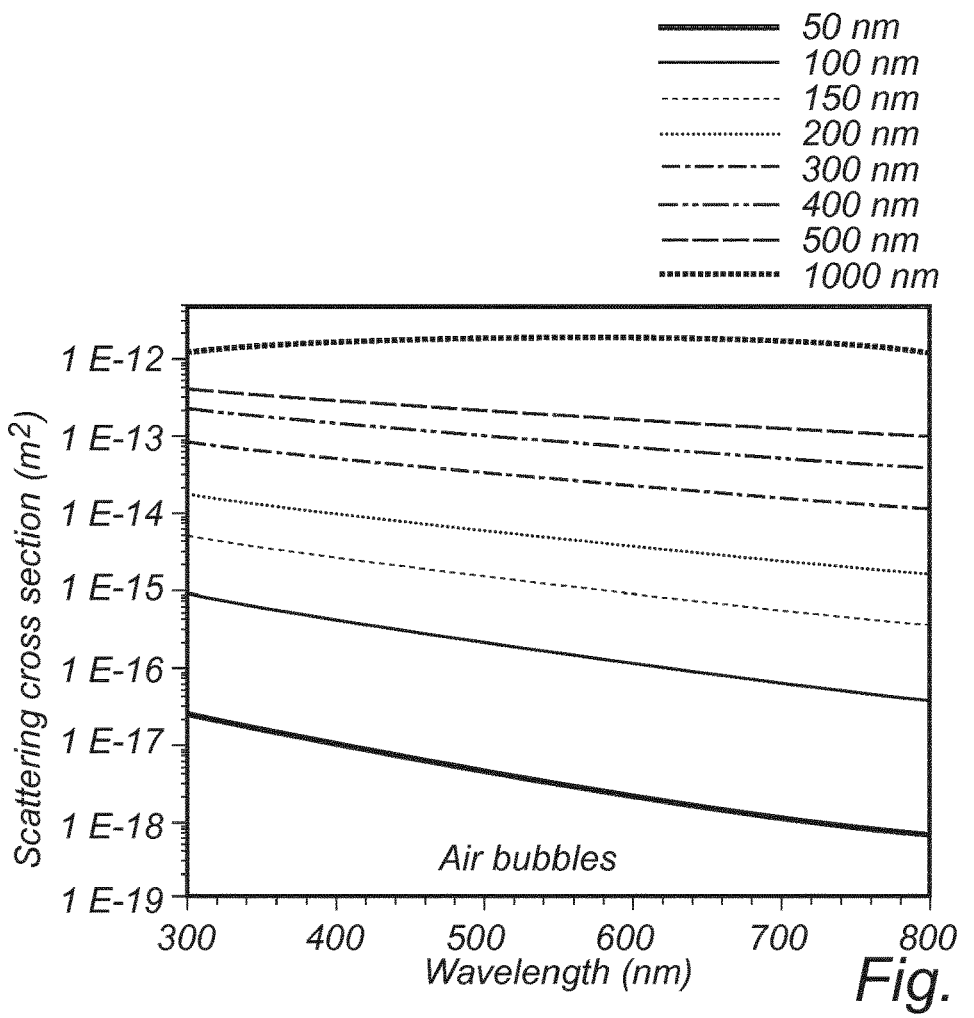
FIGS. 2a-d are charts illustrating absolute and relative scattering cross sections for air bubbles in water and for polystyrene particles in water for different diameters of the bubbles and particles, respectively.
Figure 2B:
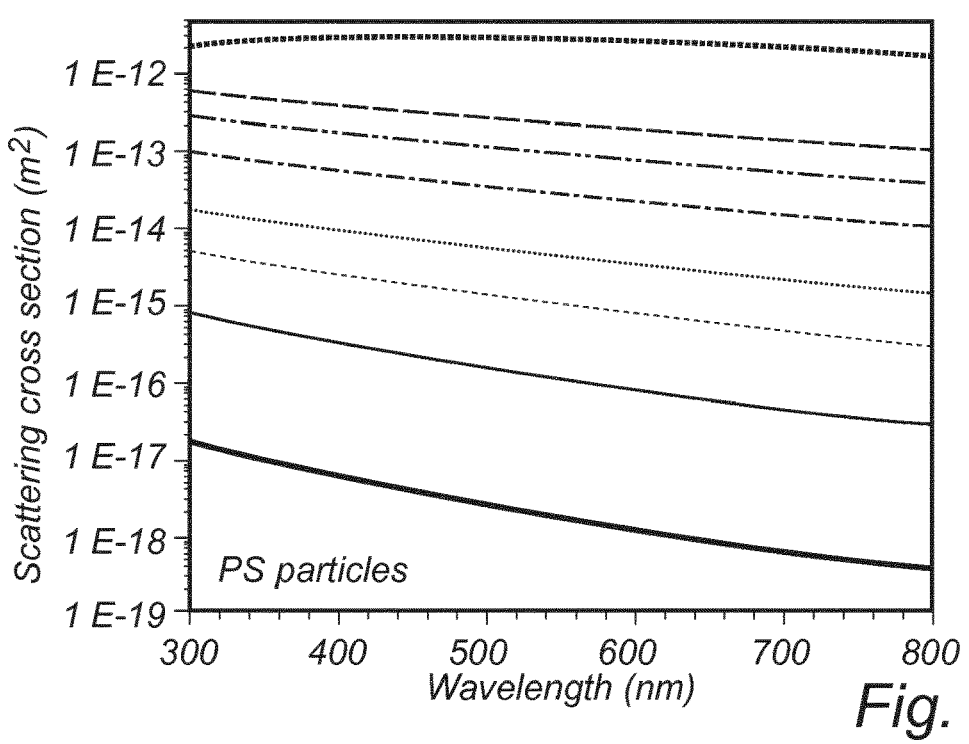
Figure 2C:
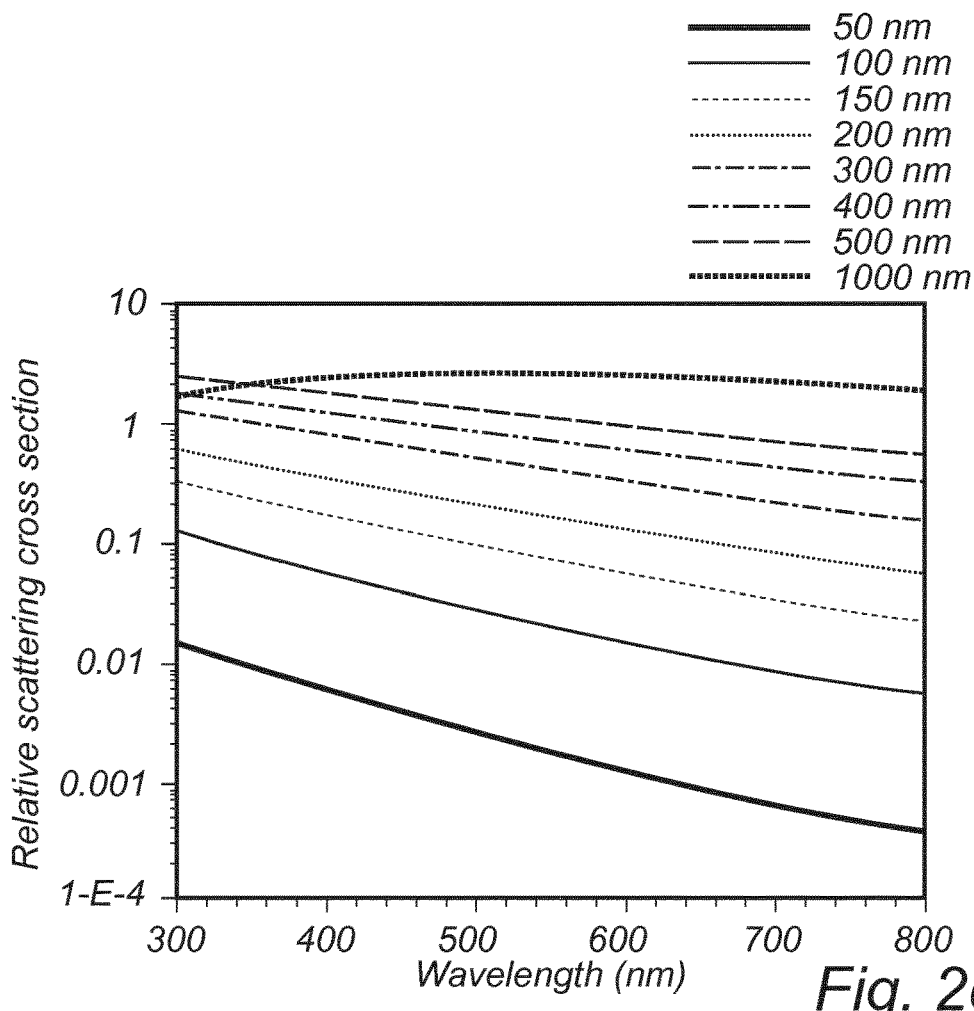
Figure 2D:
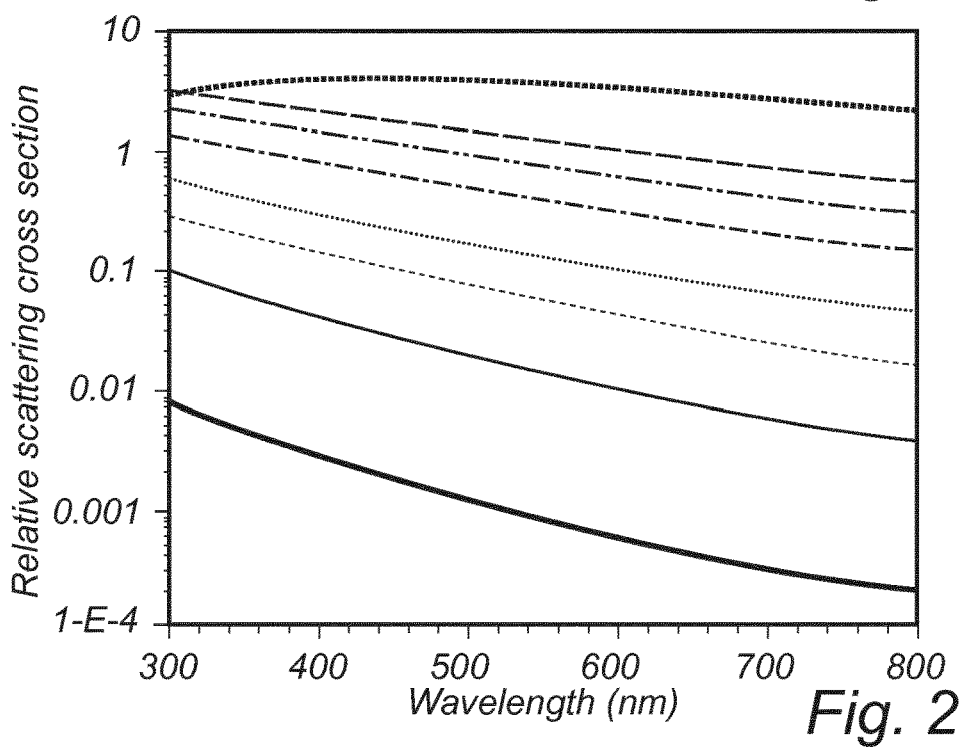

Referring now to FIG. 1, an apparatus 100 for displaying a three-dimensional image will be generally described. The apparatus 100 comprises a light field generating unit 110, which is configured to generate a three-dimensional light field based on a light beam incident on the apparatus 100. The apparatus 100 further comprises an image revealing medium 120, which is configured to receive the three-dimensional light field. The image revealing medium 120 comprises scattering sources in form of bubbles or particles in the image revealing medium 120. The scattering sources will scatter light of the three-dimensional light field so as to form points of origin of light within the image revealing medium, as controlled by a distribution of the three-dimensional light field. The scattering sources may thus output light which may be seen by an observer, such that the scattering sources may reveal a three-dimensional image to the observer based on the three-dimensional light field in the image revealing medium 120.

The apparatus 100 may further comprise a container 130 in which the image revealing medium 120 may be arranged. The container 130 may have walls 132 defining an interior hollow space, which may be filled by the image revealing medium 120.

The container 130 may be arranged on a common substrate 102 of the apparatus 100. The light field generating unit 110 may also be formed on or in the substrate 102 or be mounted on or in the substrate 102. Thus, the substrate 102 may define a well-controlled relation between the container 130 and the light field generating unit 110, such that accurate control of the three-dimensional light field in the image revealing medium 120 may be provided.

However, it should be realized that the container 130 need not necessarily be arranged on a common substrate with the light field generating unit 110. On the contrary, the container 130 may be arranged separately from the light field generating unit 110. The container 130 and the light field generating unit 110 may be mounted in a common housing so as to define a well-controlled relation between the container 130 and the light field generating unit 110. The container 130 may at least partly extend out of such a common housing in order for a view of the three-dimensional image by an observer not to be disturbed by external walls of the common housing.

At least a portion of the walls 132 of the container 130 may be transparent, at least to light of the wavelength(s) being used for forming the three-dimensional image in the image revealing medium 120. The walls 132 may be transparent on the sides of the container 130 through which the three-dimensional image is to be observed. The walls 132 may thus comprise transparent windows through which the three-dimensional image is to be observed. Alternatively, the entire (or almost entire) walls 132 may be transparent.

The container 130 may further comprise a surface or wall 134 through which light from the light field generating unit 110 is allowed to enter the container 130 and hence be projected into the image revealing medium 120 in the container 130. Light from the light field generating unit 110 may enter the container 130 through a bottom surface 134 of the container 130, which may be arranged on the common substrate 102.

The wall 134 through which light enters the container 130 may be transparent to light, at least in the part of the wall 134 through which light is entered into the container 130. Alternatively, there may be an aperture or opening in the wall 134 through which light may be allowed to enter the container 130. An optical component, such as a lens, may be mounted in the aperture in the wall 134 for controlling the light being projected into the image revealing medium 120.

The container 130 may comprise at least a first opening 136 and a second opening 138, which may allow flow of the image revealing medium 120 into and out of the container 130. This implies that the image revealing medium 120 may be replaced, such that if characteristics of the image revealing medium 120 deteriorate over time, the apparatus 100 may be provided with new image revealing medium 120 for maintaining a quality of the three-dimensional display.

The first opening 136 and the second opening 138 may be formed in a bottom wall 134 of the container 130, such that the openings 136, 138 may not interfere with a view of the three-dimensional image. Thus, the openings 136, 138 may be arranged on respective sides of a part of the wall 134 through which light is allowed to enter the container 130.

However, it should be realized that the openings 136, 138 may be arranged in any other manner allowing access to the interior space of the container 130 for replacing the image revealing medium 120.

The apparatus 100 may comprise an inlet channel 104 associated with the first opening 136 and an outlet channel 106 associated with the second opening 138. The inlet channel 104 and the outlet channel 106 may be arranged in the common substrate 102 for forming a compact apparatus 100.

The inlet channel 104 and the outlet channel 106 may each be associated with a valve for controlling whether flow of the image revealing medium 120 into or out of the container 130 is allowed. Also, the container 130 may alternatively comprise a single opening associated with a single channel, wherein a direction of flow through the channel may be controlled for using the channel both for transporting image revealing medium 120 into the container 130 and for transporting image revealing medium 120 out of the container 130.

The light field generating unit 110 may be configured to generate a three-dimensional light field based on an incident light beam 112. The light field generating unit 110 may comprise portions which have different interactions with light so as to generate a non-homogeneous three-dimensional light field based on the incident light beam 112. The light field generating unit 110 may comprise a static arrangement for generating the three-dimensional light field, such that the apparatus 100 may be arranged to display a static three-dimensional image. However, according to an alternative embodiment, the light field generating unit 110 may comprise an array 114 of unit cells 116, wherein the unit cells 116 are individually addressable for controlling an optical property of the unit cell 116 and hence controlling an optical response of the array 114 of unit cells 116.

Each unit cell 116 may be individually addressable. However, it should be realized that not necessarily each and every one of the unit cells 116 is individually addressable.

By controlling the optical property of the unit cells 116, an effect on a light beam 112 incident on the array may be controlled. Thus, the unit cells 116 may in combination form a controllable effect on the incident light beam 112. Thus, the array 114 may be used for forming and controlling a distribution of a three-dimensional light field based on the incident light beam 112.

The three-dimensional light field may be used for revealing a holographic image by the image revealing medium 120. Thanks to the unit cells 116 being controllable, a change in the holographic image formed may be provided. This implies that the apparatus 100 may be used for displaying a video of holographic images.

The light field generating unit 110 may be set up for reflecting the incident light beam 112 or transmission of the incident light beam 112. The light beam 112 may be formed by a coherent light source, such as the light beam 112 being a laser beam, which provides a well-defined relation of the incident light field on the array 114 of unit cells 116 and, hence, is suitable for using as a basis for forming the desired distribution of the three-dimensional light field using the array 114 of unit cells 116.

Each unit cell 116 may comprise a phase-change material (PCM), which may be switched between a first state and a second state, wherein switching of the PCM between the first state and the second state is configured to switch the optical property of the unit cell 116 between a first condition of the optical property and a second condition of the optical property.

The PCM may be configured to switch between a crystalline state and an amorphous state. However, it should be realized that the first and second states may be other configurations of states of the PCM. For instance, the PCM may be configured to switch between two different crystalline states.

The unit cell 116 may comprise a layer of PCM, which may be combined with other materials, e.g. in a stack of layers of materials, such that the combination of materials may define an optical property of the unit cell 116. The switching of a state of the PCM may then affect the optical property of, for instance, the stack of layers in the unit cell 116, such that a condition of the optical property of the unit cell 116 may be controlled by a state of the PCM.

For instance, the switching of state of the PCM may affect refractive index and/or permittivity of the PCM, such that e.g. a PCM layer or a stack comprising a PCM layer may be switched from a highly reflective to a low reflective state for a given wavelength of incident light.

The unit cell 116 may thus comprise a PCM layer for controlling a condition of the optical property of the unit cell 116. For instance, reflectivity or transmission of the unit cell 116 for a given wavelength may be configured to be highly dependent on the state of the PCM.

According to an embodiment, the PCM is a compound of germanium, antimony and tellurium. For instance, the PCM may be formed by $Ge_2Sb_2Te_5$ (GST). This is a material which may change between an amorphous state and a crystalline state and which may suitably be used for providing desired optical properties of the array 114 of unit cells 116.

However, it should be realized that the PCM may be any material which provides a change in optical property based on the switching between two states. The PCM may for instance be any material which may undergo a phase change in relation to being exposed to a temperature (a thermochromic material) or in relation to being exposed to light (a photochromic material) or a combination of such materials. For example, a number of different forms of vanadium oxides, such as $VO_2$ and $V_2O_3$, may be used. The PCM may include thermochromic materials formed from metal-oxide materials, such as vanadium oxide as mentioned above, polymers, such as azobenzene-containing polydiacetelenes, or nanostructured polymers, such as diblock (poly[styrene-b-isoprene]) copolymers. The PCM may alternatively be an electro-optic material that changes a condition of an optical property based on an applied electric field, such as a birefringent material, or a magneto-optic material that changes a condition of an optical property based on an applied magnetic field, such as garnets and ferro-magnetic metals.

In the specific case of using GST as the PCM, switching the material modifies the structure from a plasmonic (crystalline state) to a dielectric (amorphous state) antenna, which will exhibit very similar resonances but at different wavelengths, allowing to change a structure in the unit cell 116 from a highly reflective (transmissive) to a low reflective (transmissive) state for a given wavelength.

Upon switching of the state of GST, the optical properties are significantly altered, resulting in large changes in both real and imaginary parts of refractive index and permittivity. It should be noted that in its crystalline state, GST has a negative real part of the permittivity, which implies that it shows metallic behavior and therefore supports plasmonic resonances. In its amorphous state, GST has a positive real part of the permittivity, accompanied with a large imaginary part, meaning that it acts as a highly lossy dielectric.

The PCM in a unit cell 116 could be switched thermally (as for GST) but is not limited to that. It should be realized that in different embodiments, electro-optic materials, and magneto-optic materials may be used as alternative implementations.

It should be realized that the controlling of the state of the PCM may be provided by individually addressing the unit cell 116, e.g. by sending a control signal to electrodes associated with the unit cell 116 for inducing the switching of the state of phase-change material locally in the unit cell 116, e.g. by local heating of the PCM, or by exerting the PCM to a local electric or magnetic field.

The unit cells 116 may be configured so that the switching of conditions of an optical property of the unit cell 104 provide a strong effect of the unit cell 116 on a desired operational wavelength.

The apparatus 100 may comprise control lines which may be integrated in the substrate 102 such that control signals may be provided to the unit cells 116. The control signal may induce a change in optical property of the unit cell 116, e.g. by the control signal providing heating of the unit cell 116 or forming an electric or magnetic field to cause a switching of the optical property of the unit cell 116.

The apparatus 100 may comprise an individual control line for each of the unit cells 116 for controlling the unit cell 116. According to an alternative, the apparatus 100 may comprise a plurality of control lines arranged in columns and lines, such that an individual unit cell 116 may be controlled by cross-point addressing using the control lines.

The light field generating unit 110 may further comprise an optical system 118 for transferring the three-dimensional light field generated by the array 114 of unit cells 116 into the image revealing medium 120. Thus, the optical system 118 may be arranged between the array 114 of unit cells 116 and the image revealing medium 120.

The optical system 118 may guide the light from the array 114 of unit cells 116, e.g. by re-directing an optical path of the light. This may imply that requirements on a geometric relation between the array 114 of unit cells 116 and the image revealing medium 120 (in the container 130) may be relaxed.

The optical system 118 may further comprise one or more lenses and/or one or more aperture stops, which may control that the three-dimensional light field is transferred into the image revealing medium 120 with desired dimensions.

The optical system 118 may be arranged in or on the common substrate 102 between the array 114 of unit cells 116 and the container 130. According to one embodiment, a component of the optical system 118, such as a lens, may be arranged in a wall 134 of the container 130 for transferring light into the container 130 through the lens in the wall 134.

The apparatus 100 may further comprise one or more light sources 140 for providing illumination light of the operational wavelength(s) of the apparatus 100. As mentioned above, the one or more light sources 140 may be configured to provide an incident light beam 112 on the array 114 of unit cells 116.

The light field generating unit 110 may operate in a reflective arrangement or a transmissive arrangement, i.e. the array 114 of unit cells 116 being arranged to reflect or transmit the incident light beam 112. The one or more light sources 140 are mounted in relation to the light field generating unit 110 in dependence of whether a reflective or transmissive arrangement is used.

In FIG. 1 a single light source 140 is shown mounted on or in the common substrate 102 above the array 114 of unit cells 116 for providing an incident light beam 112 which will be reflected by the array 114 of unit cells 116 towards the image revealing medium 120. Thus, a well-defined relation between the light source 140 and the array 114 of unit cells 116 may be provided.

The light source 140 may be associated with an optical system 142, such as one or more lenses and/or one or more aperture stops for forming a desired shape of the incident light beam 112 on the array 114 of unit cells 116 and for illuminating the entire array 114.

The light source 140 may be any type of laser source, such as a laser source with a well-defined operational wavelength or a laser source with a tunable operational wavelength.

It should be realized that the apparatus 100 may comprise one or more light sources 140, which may be mounted in a pre-defined and accurate relationship to the array 114 of unit cells 116 in order to ensure that a desired incident light beam is provided on the array 114 of unit cells 116. It should also be realized that the one or more light sources 140 may be mounted in the apparatus 100 for providing an incident light beam 112 which is reflected or transmitted by the array 114 of unit cells 116.

However, the apparatus 100 may alternatively be manufactured and delivered without including a light source. Thus, a user may be able to separately acquire light source(s) and the apparatus 100 in order to set up the apparatus 100 with the light source(s) for forming the three-dimensional display. This may provide flexibility to a user for designing an own system and e.g. choosing operational wavelength(s) of the light sources to be used with the apparatus 100.

The apparatus 100 may further comprise a controller 150, which may control functions of the light field generating unit 110 and in particular the array 114 of unit cells 116. The controller 150 may be integrated in a unit on which the array 114 of unit cells 116 is formed and may provide control of when control signals are to be provided to unit cells 116 for switching a condition of an optical property of the unit cells 116.

Thus, the array 114 of unit cells 116 with associated control circuitry and the controller 150 may be manufactured in one piece, such as in an integrated circuit package, providing pins for input and output of signals to the package. This may imply that the integrated circuit package may be mounted on the common substrate 102 providing integrated functionality for controlling the array 114 of unit cells 116 so as to control the display of the three-dimensional image.

However, it should be realized that the controller 150 may be separately provided. Thus, the controller 150 may make use of a general-purpose processing unit of the apparatus 100 and may be implemented as a software being executed by the processing unit. This may be advantageous for enabling updating of functionalities of the controller 150. For simplicity, the controller 150 is illustrated in FIG. 1 as being arranged separately from array 114 of unit cells 116.

The controller 150 may receive information of a desired holographic image to be displayed and may execute an algorithm for calculating of the condition of the optical property to be set for the respective unit cells 116 in order to form the desired distribution of the three-dimensional light field. Alternatively, the controller 150 may receive information of the conditions of the optical property to be set for the unit cells 116 from an external unit, which may execute the algorithm.

The controller 150 may also control the light sources 140, e.g. for controlling when a light source 140 is to be activated or for controlling a property of the incident light beam 112, such as a polarization of the incident light beam 112.

The controller 150 may also determine when the image revealing medium 120 is to be replaced and may be configured to output a signal when such a determination is made. The controller 150 may determine that the image revealing medium 120 needs to be replaced based on receiving a measurement result. However, according to an embodiment, the apparatus 100 may be set to replace the image revealing medium 120 at regular intervals and the controller 150 may be configured to keep track of when it is time to replace the image revealing medium 120.

The image revealing medium 120 may have a long-term stability to maintain stable properties for a long time, even reaching up to several months. A frequency at which the image revealing medium 120 is replaced may be set in dependence on a desired quality of the three-dimensional image. For instance, the controller 150 may be set to control replacing of the image revealing medium once every hour, once every day or once every month.

The controller 150 may output a signal which may trigger replacing the image revealing medium 120. Thus, the controller 150 may output a signal which may activate valves and/or pumps for controlling flow of the image revealing medium 120 into and out of the container 130. The replacing of the image revealing medium 120 may be automated, with the apparatus 100 being connected to a reservoir or supply of image revealing medium 120 or for enabling forming of new image revealing medium 120. Thus, the signal output by the controller 150 may trigger such automated control for replacing the image revealing medium 120. However, the controller 150 may alternatively output a signal to a user, e.g. in the form of presenting information on a display or activating a lamp or a speaker for alerting a user of a need of replacing the image revealing medium 120. The user may thus manually control replacing of the image revealing medium 120 such as connecting the apparatus 100 to a supply of new image revealing medium 120.

It should be realized that the controller 150 may be implemented as one or more processing units, such as a central processing unit (CPU), which may execute the instructions of one or more computer programs in order to implement functionality of the apparatus 100.

The controller 150 may alternatively be implemented as firmware arranged e.g. in an embedded system, or as a specifically designed processing unit, such as an Application-Specific Integrated Circuit (ASIC), a microcontroller unit (MCU) or a Field-Programmable Gate Array (FPGA).

The apparatus 100 may further comprise at least one calibration sensor 160. The at least one calibration sensor 160 may acquire a measurement result which may be used by the controller 150. The measurement result of the calibration sensor 160 may be used for determining whether the image revealing medium 120 needs to be replaced.

The calibration sensor 160 may be configured to receive light being transmitted through the image revealing medium

120 for detecting an intensity of received light as a measure of attenuation of a light beam propagating through the image revealing medium 120.

The calibration sensor 160 may be mounted at an inner wall of the container 130 opposite to the wall 134 through which light enters the container 130. Thus, the calibration sensor 160 may receive light having propagated through the image revealing medium 120. However, as an alternative, a mirror or reflective surface may be mounted at an inner wall of the container 130 opposite to the wall 134 through which light enters the container 130. Then, the calibration sensor 160 may be arranged in proximity of the light field generating unit 110 and receive a back reflection from the mirror/reflective surface so as to detect light having propagated (twice) through the image revealing medium 120. In some embodiments, the apparatus 100 may comprise multiple calibration sensors 160 and/or mirrors for determining local density variations in the image revealing medium 120 (by determining propagation of light through different parts of the volume of the image revealing medium). This may give even improved feedback to the controller 150.

The calibration sensor 160 may be used when the image revealing medium 120 in the apparatus 100 is replaced in order to determine attenuation of light of the new image revealing medium 120. The measurement result of the calibration sensor 160 may be used in setting an intensity of light to be received by the image revealing medium 120.

When performing a measurement by the calibration sensor 160, a calibration pattern may be generated by the light field generating unit 110, wherein the calibration pattern focuses a light beam onto the calibration sensor 160 which allows measuring the attenuation of the propagating beam through the image revealing medium 120 for different colors.

During replacing of the image revealing medium 120, measurement results of the calibration sensor 160 may also be used for determining whether a property of the image revealing medium 120 is to be adjusted. For instance, the calibration sensor 160 may be used for determining whether a concentration of bubbles or particles need to be increased, such that further bubbles or particles may be injected to the image revealing medium 120 in the container 130 (through the inlet channel 108 or through a separate inlet of bubbles or particles). Thus, the calibration sensor 160 may be used for controlling properties of the image revealing medium 120 when the image revealing medium 120 is being replaced.

The controller 150 may also or alternatively use measurement results of the calibration sensor 160 in order to enable detecting if characteristics of the image revealing medium has changed (e.g. if concentration of bubbles has decreased or if a distribution of bubbles or particles in the image revealing medium 120 has changed) such that a need of replacing or adjusting the image revealing medium 120 may be identified.

The controller 150 may be configured to generate the calibration pattern at regular intervals for performing of the measurements of the calibration sensor 160. A measurement of the calibration sensor 160 may alternatively or additionally be triggered upon start-up of the apparatus 100.

As mentioned above, the apparatus 100 may be connected to a reservoir or supply of image revealing medium 120. The connection may be formed when a need of replacing the image revealing medium 120 occurs. The apparatus 100 may thus receive the image revealing medium 120 from an external supply or from a reservoir.

The image revealing medium 120 may comprise bubbles or particles suspended in a fluid. Bubbles in the fluid may have a long-term stability in that the bubbles do not dissolve in the fluid and do not rise to the surface of the fluid to burst there. However, over a long period of time, some bubbles may disappear and the quality of the image revealing medium 120 may deteriorate.

Particles in the fluid may not disappear in the same manner as for bubbles as explained above. However, quality of an image revealing medium 120 comprising particles may also deteriorate due to a distribution of the particles in the fluid changing.

When the image revealing medium 120 needs to be replaced, the bubbles may be formed or particles may be introduced in the fluid of the new image revealing medium 120 to be introduced into the container 130. Thus, the image revealing medium 120 with particles or bubbles suspended in the fluid may be formed at a time when the image revealing medium 120 is to be replaced.

The forming of the new image revealing medium 120 may involve manual operation for forming the image revealing medium 120 such as introducing particles into the fluid. However, the forming of the new image revealing medium 120 may alternatively be automated or semi-automated in that the fluid is mixed with particles or in that bubbles are injected into the image revealing medium 120.

In one embodiment, the apparatus 100 may comprise a bubble generating device 170. The bubble generating device 170 may be configured to receive a fluid and may be configured to inject bubbles into the fluid such that bubbles are suspended in the fluid. The bubble generating device 170 may thus generate the image revealing medium 120 and may be connected to the inlet channel 104 for providing the image revealing medium 120 into the container 130.

For instance, the bubble generating device 170 may comprise a gas inlet for receiving a gas from which the bubbles are to be formed. The bubble generating device 170 may further comprise a compressor for pressurizing the gas. The bubble generating device 170 may further comprise one or more nozzles for introducing the pressurized gas into the fluid and form bubbles therein. The pressure of the gas and the size of the nozzles may control a size of the bubbles formed in the fluid.

By the apparatus 100 comprising a bubble generating device 170, the apparatus 100 may only need to be connected to a fluid inlet and a gas inlet in order to be able to form the image revealing medium 120. The fluid may be water and the gas may be air, which implies that the fluid and gas may be readily available. Also, the image revealing medium 120 may thus be formed from non-hazardous substances, which facilitates handling of the image revealing medium 120 when old image revealing medium 120 being replaced is to be disposed of.

Now, the image revealing medium 120 will be described in further detail. The image revealing medium 120 may comprise a fluid, which should be transparent to the operational wavelength(s), and bubbles or particles suspended in the fluid, forming scattering points in the fluid.

Below, factors for selecting a size of the particles or bubbles will be discussed. In this regard, size should be construed as a diameter of a sphere, but especially the particles may not necessarily be exactly spherical, so the size could also be construed as a largest cross-section of the particle or bubble or an equivalent spherical diameter of the particle or bubble.

The following factors may be taken into account when selecting the size of the particles or bubbles:

1. The scattering medium should scatter with sufficient efficiency in order for the observer to be able to see a clear holographic image in terms of scattered intensity, translating into a desired resolution and contrast.
2. The scattering medium should not cause too high attenuation for the operational wavelengths, as high attenuation would limit the maximum dimensions of the volume of the image revealing medium
3. The scatterer density inside the medium should be large enough (i.e. bubble or particle concentration needs to be sufficiently high to always have at least one or several bubbles or particles inside the smallest discernible volume, voxel, of the image revealing medium 120) to efficiently scatter the light.

The bubble or particle sizes being used in the present disclosure are in ranges to benefit from Tyndall scattering (scattering by particles/bubbles smaller than or similar in size to the operational wavelength) and Rayleigh scattering (scattering by particles much smaller than the operational wavelength). The Tyndall and Rayleigh scattering mechanisms are fairly similar in nature, especially in the sense that the scattering efficiency scales with the $4^{th}$ power of the frequency. In sub-wavelength sized suspensions in a fluid with a constant background refractive index (e.g. particles in water suspension, bubbles in water suspension), the scattering effects result from the electrical polarizability of such particles/bubbles in which the charges oscillate along with the driving electric field, and as such the particle acts as a point dipole source whose radiation is observed as scattered light.

In terms of size selection for ultrafine bubbles or particles, a trade-off has to be made in having high enough scattering efficiency in each voxel of the image revealing medium 120 and having low enough absorption/scattering for the image revealing medium 120 to still be sufficiently transparent as to not hamper the view and enable illuminating voxels over the entire volume of the image revealing medium 120.

In a uniform medium that weakly absorbs and/or scatters light, the intensity decay is defined by Beer-Lambert's law which states that there is exponential decay of the light intensity with propagation distance. In its simplest form, Beer-Lambert's law can be written as $$A = \log_{10}\frac{I_t}{I_0} = -\log_{10}T,$$

wherein A is the absorbance of the medium, T is the transmittance of the medium, $I_t$ is the transmitted intensity of light and $I_0$ is the intensity of the incident light. This can be rewritten as function of the optical depth $\tau$ as $$T = \frac{I_t}{I_0} = e^{-\tau} = 10^{-A}.$$

This implies that an absorption coefficient expressed in dB/m can be used to define the required concentration of bubbles or particles and sizes of bubbles or particles.

For achieving sufficient propagation through the image revealing medium 120 and having reasonable brightness throughout the volume of the image revealing medium 120, the apparatus 100 may be designed such that between 10% and 1% of light is allowed to propagate through the entire volume of the image revealing medium 120. This corresponds to the power of light going down by 10 to 20 dB over the entire volume of the image revealing medium 120.

The volume of the image revealing medium 120 may be defined by a size of a cube in a range of 0.1-1 m. This would imply that the apparatus 100 may provide a relatively large volume of the image revealing medium 120 so as to facilitate viewing of the three-dimensional image by an observer. However, it should be realized that even larger sizes of the volume of the image revealing medium 120 may be of interest, at least when technology of three-dimensional display evolves.

Based on an assumption that power of light should go down by 10 to 20 dB over the entire volume and that a side of the volume of the image revealing medium being in the range of 0.1-1 m, the apparatus 100 may advantageously be designed to provide an attenuation constant between -10 to -200 dB/m.

As the scattering intensity of small particles or bubbles scales with the $4^{th}$ power of the frequency, larger illumination power will be required to reach similar scattering intensities for longer wavelengths compared with shorter wavelengths. This implies that intensity of light of incident light beams 112 should be lowest for blue light and larger for green light and red light, respectively, in order to provide similar scattering intensities of light in the image revealing medium 120.

An air bubble in water may affect light in a similar manner as a particle in water, wherein the relation between the refractive index of the water and air is similar to the relation between the refractive index of the particle and water. In particular, water has a refractive index of approximately 1.33 whereas air has a refractive index of approximately 1.00. The optical behavior of air bubbles in water may then be compared with the optical behavior of plastic particles in water, wherein the plastic material may be selected, e.g. as polystyrene, having a refractive index of 1.60. Measurements have been made based on polystyrene particles suspended in water, and it may be assumed that corresponding behavior will be provided for air bubbles in water.

Referring now to FIGS. 2a-d, simulations of scattering cross sections and relative scattering cross sections for air bubbles in water (FIGS. 2a and 2c) and polystyrene particles in water (FIGS. 2b and 2d) are shown.

In particular for bubbles or particles having a diameter from 50 nm up to 200 nm, the relative scattering cross section is below 1, which implies that the image revealing medium 120 comprising bubbles or particles of such sizes will have fairly low scattering losses, such that the scattering medium will be relatively transparent. It is also clear that in order to have the same scattering intensity for blue, green and red light, respectively, the power of the incident light beam 112 should increase when going from blue light towards red light.

Using polystyrene particles of different sizes, absorbance measurements were made, i.e. measurements to determine attenuation of an image revealing medium 120 comprising particles of different sizes and different concentrations.

Figure 3A:
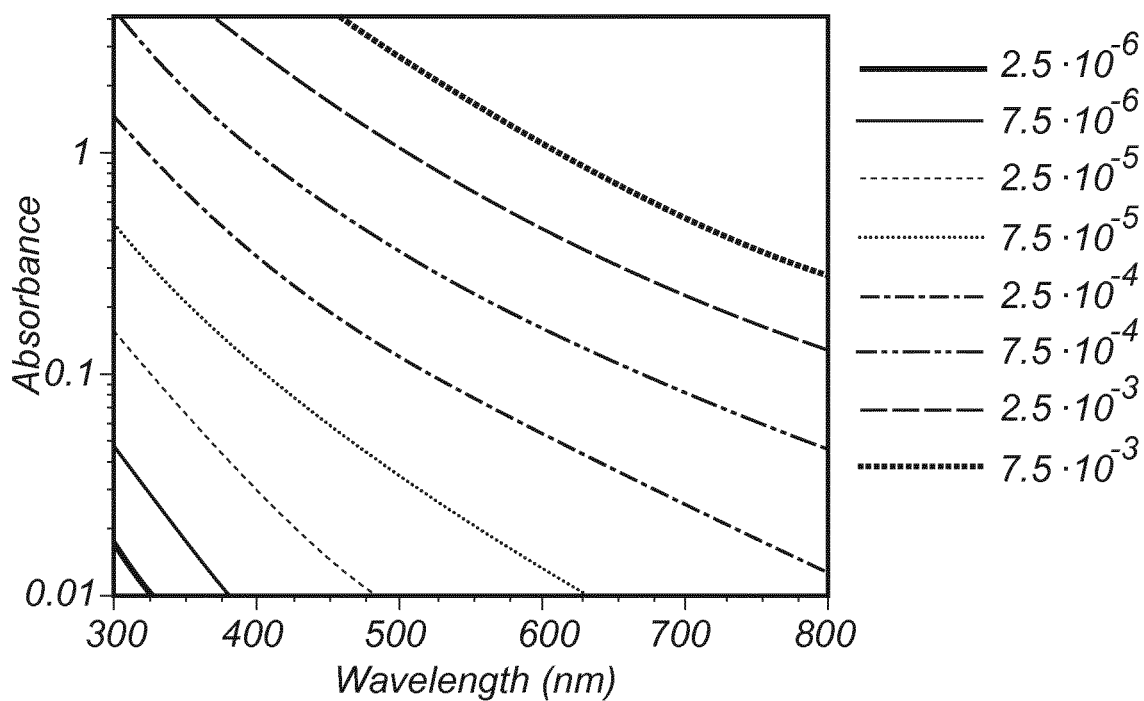
FIGS. 3a-c are charts illustrating absorbance of an image revealing medium as function of wavelength for different sizes of particles of the image revealing medium.
Figure 3B:
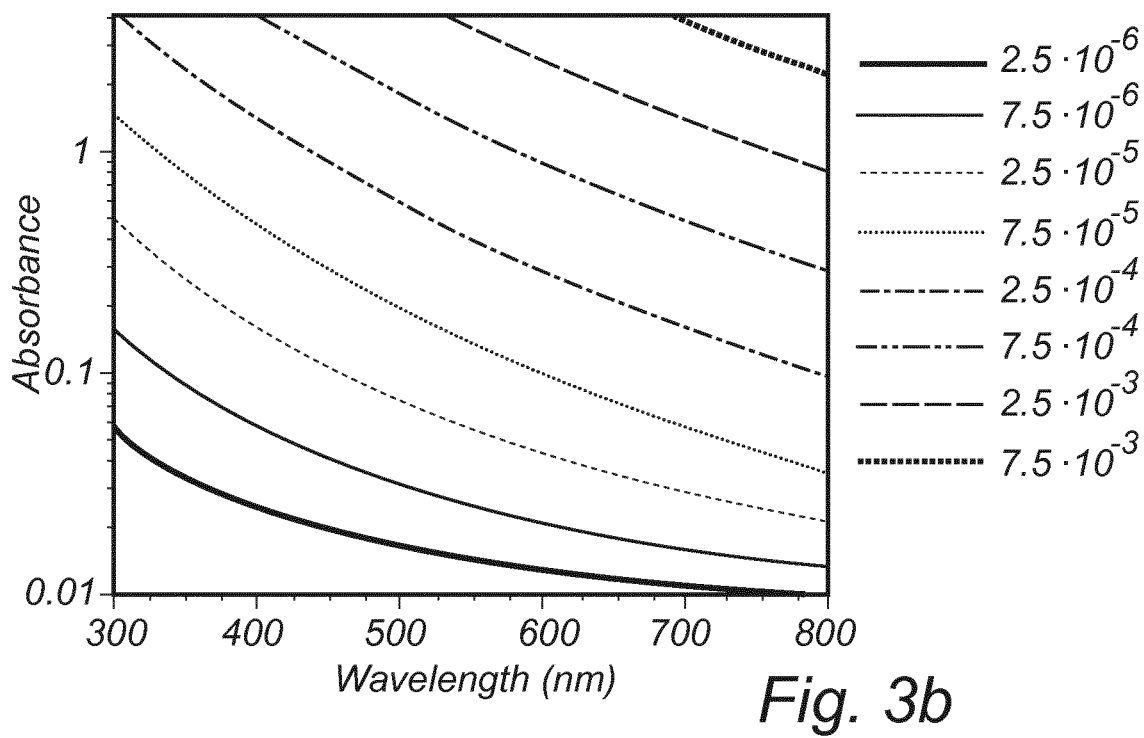
Figure 3C:
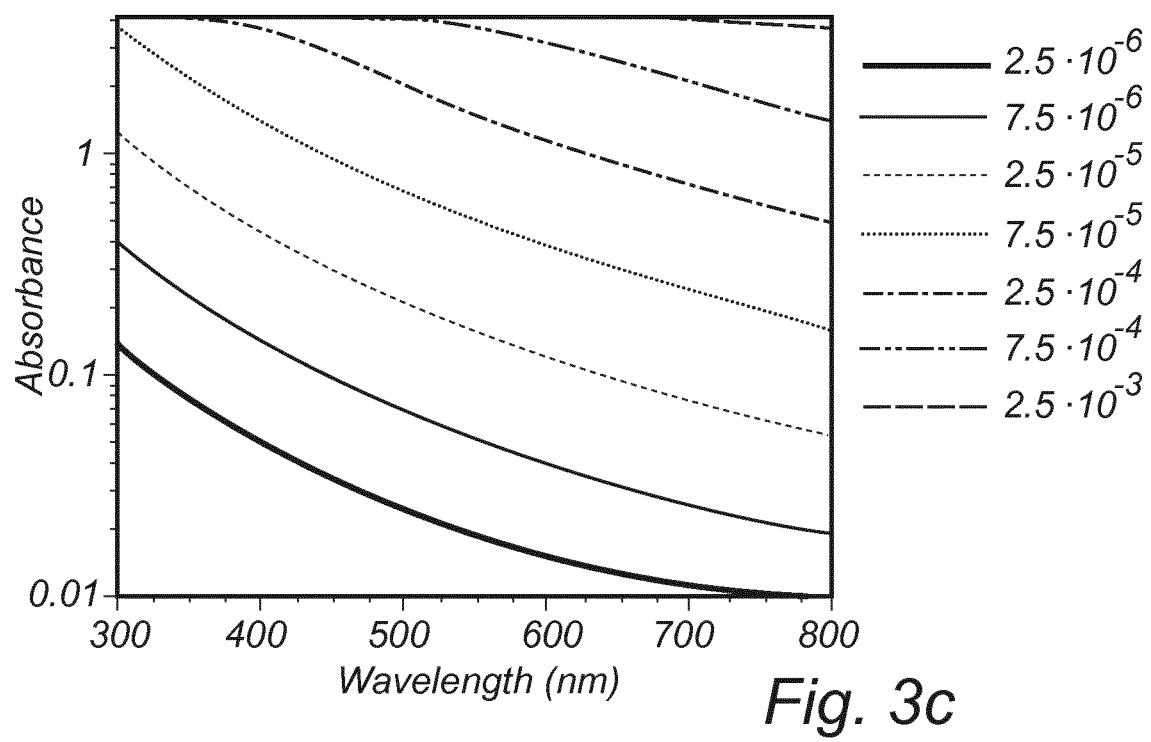

In FIGS. 3a-c, the absorbance for different sizes of the particles are shown as a function of wavelength. In FIG. 3a, the diameter size of particles is 65 nm. In FIG. 3b, the diameter size of particles is 120 nm. In FIG. 3c, the diameter size of particles is 250 nm. For each diameter size, absorbance is indicated for different concentrations in terms of weight percentage of polystyrene in the medium. The same weight percentage is illustrated by same dashing of the lines in FIGS. 3a-c. It should be realized that the same weight percentage does not correspond to the same number of particles per volume unit in the medium.

It is clear from FIGS. 3a-c that with increasing particle size, the same weight percentage yields a larger absorbance of the medium.

Figure 4:
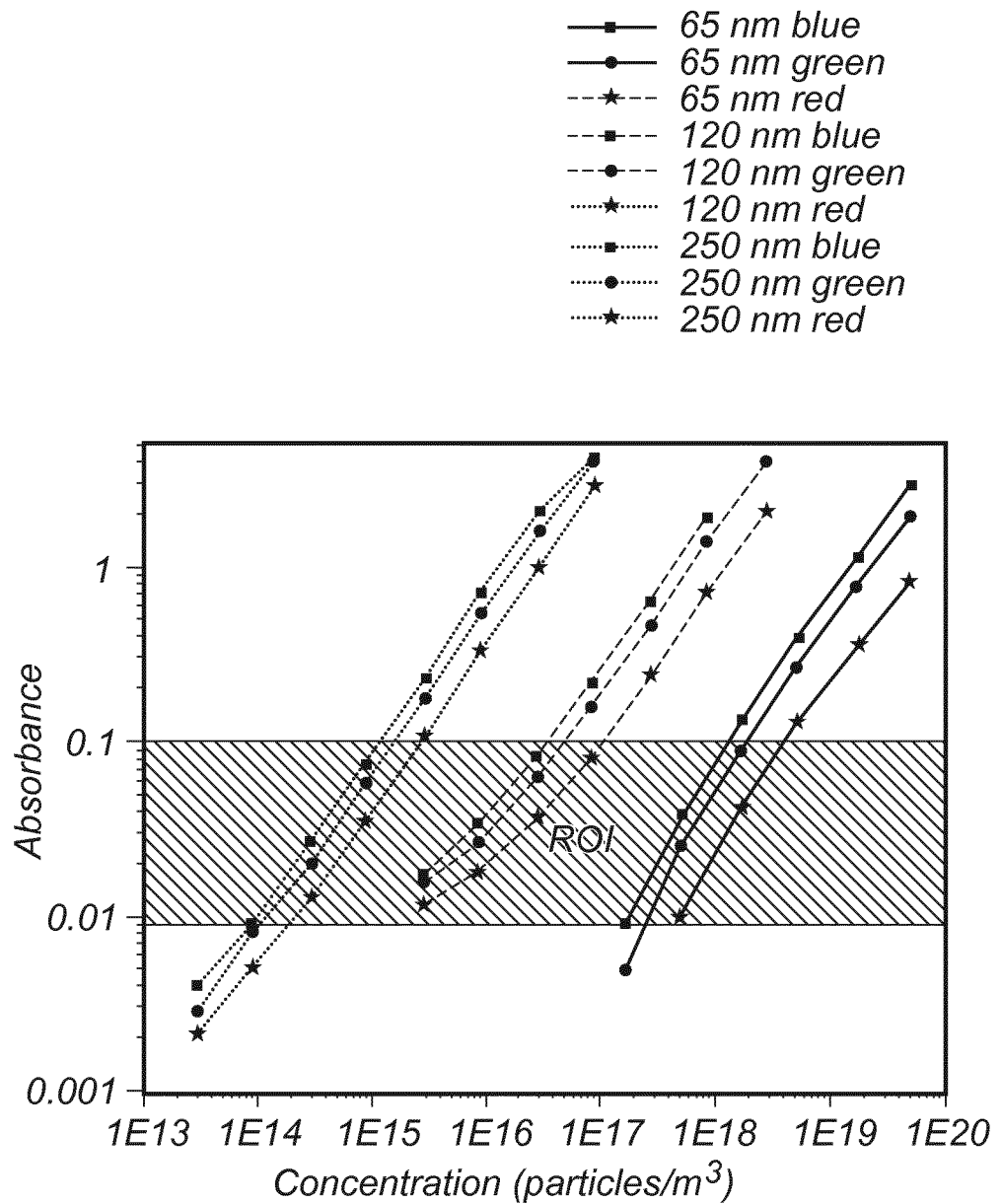
FIG. 4 is a chart illustrating absorbance of an image revealing medium as function of concentration of particles in the image revealing medium.

Based on these measurements, absorbance as a function of concentration of particles/m³ of the particles may be defined. In FIG. 4, the absorbance as a function of concentration is illustrated. The absorbance may advantageously be between 0.01-0.1 (corresponding to an attenuation constant of 10-100 dB/m), as indicated by the hatched area in FIG. 4. Such values would at least be interesting for a volume of the image revealing medium of 1 m³.

In FIG. 4, appropriate concentrations of particles may be determined based on different sizes of the diameter of the particles. A higher concentration of particles may be needed for smaller sizes of the particles.

Using a lower desired value of absorbance of 0.01 (attenuation factor of 10 dB/m) and an upper desired value of absorbance of 0.1 (attenuation factor of 100 dB/m), characteristics of the image revealing medium 120 for different sizes of particles may be defined according to the following table.

|  | Concentration | | Fill factor | | Distance | | Particles/mm³ | |
| --- | --- | --- | --- | --- | --- | --- | --- | --- |
| Diameter | Lower | Upper | Lower | Upper | Lower | Upper | Lower | Upper |
| 65 nm | $10^{17}$ | $10^{19}$ | $10^{-5}$ | $10^{-3}$ | 1.0 | 0.1 | $10^8$ | $10^{10}$ |
| 120 nm | $10^{15}$ | $10^{17}$ | $10^{-6}$ | $10^{-4}$ | 10.0 | 1.0 | $10^6$ | $10^8$ |
| 250 nm | $10^{13}$ | $10^{16}$ | $10^{-7}$ | $10^{-4}$ | 40.0 | 3.0 | $10^4$ | $10^7$ |

In this table, the concentration is given as number of particles/m³, the fill factor is a volumetric fraction of the particles versus the fluid (water) in which the particles are suspended, the distance is a length in μm of a cubic volume in which a single particle is present (or in other words, the average distance between two adjacent particles in the fluid), and particles/mm³ illustrates the number of particles per volume of a cube having a side of 1 mm, which may give an indication of the number of particles per voxel.

It is clear from this table that an image revealing medium 120 with particles in the tested range may be designed with a suitable attenuation factor for enabling propagation through a large volume of the image revealing medium 120 (so as to enable a large three-dimensional display) while allowing a large number of particles within a small volume of the image revealing medium 120 such that a high resolution of a three-dimensional image may be provided in that a smallest discernible volume may be set to be very small.

Although test results have only been obtained for particles in a fluid, corresponding results may be expected based on bubbles in the fluid since the refractive index contrast between air and water is very similar to the index contrast between polystyrene and water and, therefore, in optical terms an image revealing medium 120 comprising bubbles is very similar to an image revealing medium 120 comprising particles.

Ultrafine bubbles (bubbles with a diameter smaller than 500 nm and, in particular having a diameter smaller than 200 nm) may have a long-term stability, reaching up to several months.

Instability of bubbles may be due to different mechanisms, depending on the size of the bubbles. So-called milli-bubbles (having a diameter in a range of 1 μm-1 mm) typically rise fairly fast in a fluid to then burst when reaching the surface. So-called microbubbles (having a diameter in a range of 10 μm-50 μm) tend to disappear under water and decrease in size. However, ultrafine bubbles (having a diameter below 500 nm and in particular below 200 nm) show long-term stability, reaching up to several months. Therefore, it is a realization that such bubble sizes are of particular interest in use in an image revealing medium 120, as regeneration or replacing of the medium would not need to happen frequently.

It is believed that the long-term stability of bubbles can be attributed to the large surface to volume ratio for these small bubbles, making them highly reactive with their environment. Ultrafine bubbles in water have negative surface charge, as can be verified by Zeta-potential measurements. This negative surface charge enhances chemical interaction with oppositely charged molecules or small particles. In practical implementation, ultrafine bubbles are extremely long-lived when dispersed in electrolyte solutions, where the positive charges will arrange around the bubbles due to Coulomb interaction and will as such form a shield that avoids gas molecules to escape the bubble.

Moreover, the surface charge will help to have a more uniform particle distribution within the medium due to the repelling Coulomb force between particles with the same charge. This effect will result on a fairly constant distribution of the bubbles in the fluid with a quite uniform average inter-particle distance that promotes uniformity of the scattering intensity within the image revealing medium 120.

For the ultrafine bubbles of interest, the gas pressure inside is very large, in the range of about 10-30 atmospheres. This implies that, given the long-term stability of the bubbles, a surface tension of such bubbles is also very large. Due to their small sizes, ultrafine bubbles tend to randomly move around at high speed in solution, while continuously interacting with neighboring particles due to the Coulomb repulsion. This implies that there is little to no physical interaction between the bubbles, which probably contributes to the long-term stability of the bubbles as well. Therefore, such bubbles will further not have a tendency to rise to a surface of a medium or collapse, as is the case for micro- and milli-bubbles. Thus, the ultrafine bubbles may exhibit neutral buoyancy and a distribution of bubbles within the image revealing medium 120 may be maintained constant over long time.

Ultrafine bubbles in water may have an anti-bacterial function when present in a sufficiently high concentration, meaning more than $2.10^8$/ml ($2.10^{14}$/m³). An anti-bacterial function of the image revealing medium 120 may be advantageous as it may simplify handling of the image revealing medium 120.

If the minimum concentration requirement for obtaining anti-bacterial functionality with the desired concentration in terms of optical scattering properties of FIG. 4, it may be seen that the minimum concentration may be provided at least for bubble sizes below 120 nm in diameter. Also, if a higher absorbance is allowed, bubble sizes of 250 nm in diameter may be used.

Although it is described above that the image revealing medium 120 may be provided with bubbles or particles so that a distribution of the bubbles or particles in the image revealing medium 120 is maintained constant over a long period of time, it should be realized that it may still be of interest to provide active control of the image revealing medium 120.

Thus, according to an embodiment, the controller 150 may be configured to control valves and/or pumps for actively controlling the image revealing medium 120 in the container 130. The controller 150 may dynamically control the image revealing medium 120, e.g. in dependence of the three-dimensional image to be displayed. Hence, the controller 150 may control adjustment of an optical attenuation constant by ensuring that characteristics of the image revealing medium 120 is changed when desired.

Active control of the image revealing medium 120 may be provided in advance of display of a three-dimensional image requiring different optical attenuation constant by means of the controller 150 controlling the image revealing medium 120 to be replaced. Such control may be relatively slow and may not allow for changing optical attenuation constant within a sequence of images to be displayed in rapid sequence, such as in a video.

According to another embodiment, the controller 150 may be configured to control a circulation of image revealing medium 120 for continuously pumping the image revealing medium 120 through the container 120. The apparatus 100 may then be provided with a flow control system for pumping the image revealing medium 120 through the container 130.

The flow control system may provide a closed circuit wherein image revealing medium is continuously transported into the container 130 (e.g. through the inlet channel 104) and out of the container (e.g. through the outlet channel 106). The outlet channel 106 may then be connected to the inlet channel 104 for providing circulation of the image revealing medium 120.

In a path of the flow control system outside the container 130, the flow control system may comprise a medium control unit 180 (illustrated in relation to embodiments of FIGS. 5-6 discussed in further detail below). The medium control unit 180 may be connected to the bubble generating device 170 for enabling bubbles to be introduced into the image revealing medium 120. Alternatively, the medium control unit 180 may be connected to a particle supply for enabling particles to be introduced into the image revealing medium 120. Also, the medium control unit 180 may comprise a filter for filtering bubbles or particles by size or density or a combination of size and density. The medium control unit 180 may then dynamically control a property of the image revealing medium 120 by controlling mixing of inlet of bubbles or particles into the image revealing medium 120 and/or controlling filtering of bubbles or particles in the image revealing medium 120.

Filtering of bubbles or particles in the medium control unit 180 may be achieved by an external force. For instance, an external field, such as an acoustic (pressure) wave or an electromagnetic wave, may be controlled by the medium control unit 180 to exert a force on the bubbles or particles in the image revealing medium 120 so as to allow filtering of bubbles or particles. Filtering may also or alternatively be achieved using at least one semi-permeable membrane or porous membrane, optionally in combination with an applied pressure acting on the image revealing medium 120.

Active control of the image revealing medium 120 may be used for advanced control of display of the three-dimensional image. The active control may be used for controlling brightness and contrast of the three-dimensional image to be observed.

Also, the controller 150 may receive measurement results from the calibration sensor 160, which may be used for controlling the medium control unit 180. Such control based on the measurement results from the calibration sensor 160 may be used for ensuring that the optical attenuation constant of the image revealing medium 120 is maintained constant so as to ensure constant optical properties of the image revealing medium 120. Alternatively, the measurement results from the calibration sensor 160 may be used as input for a control of the image revealing medium 120, when the properties of the image revealing medium 120 are to be dynamically changed.

In some embodiments, it would be useful to have local control over the scattering efficiency depending on a position within a volume of the image revealing medium 120. Since a constant bubble or particle concentration within the image revealing medium 120 causes light to decay exponentially as it propagates through the image revealing medium 120, larger intensities of light would be required for a voxel far away from the entrance of light into the image revealing medium 120 to scatter as intensely as for a voxel close to the entrance of light into the image revealing medium 120.

Local control of the scattering efficiency in voxels of the image revealing medium 120 may be realized in multiple ways.

According to an embodiment, the image revealing medium 120 may be divided in segments, where the concentration of bubbles in the image revealing medium 120 increases with a distance away from the entrance of light into the image revealing medium 120. Such implementation has the advantage that the intensity of the light field can be uniformly (or at least more evenly) distributed depending on the position of the voxels in the three-dimensional image. This may allow the algorithm for calculating the three-dimensional light field to be formed to take the decay of light through the image revealing medium 120 into account in a relatively simple manner.

The segmentation of the image revealing medium 120 may be achieved by providing several compartments 130a-f within the container 130. Thus, each compartment 130a-f may be provided with a separate inlet/outlet and image revealing medium 120 having appropriate concentration of bubbles/particles may be arranged in each compartment 130a-f. The compartments 130a-f may be divided by transparent walls having a similar refractive index as the fluid so as to not influence propagation of light through the container 130.

In a similar manner, instead of having a varying concentration of bubbles or particles in different segments of the volume of the image revealing medium 120, the image revealing medium 120 may be provided with particles or bubbles of different sizes in different segments. As discussed above, larger sizes of particles or bubbles may cause a larger decay of the propagation of light, such that the image revealing medium 120 may have an increasing size of bubbles or particles increases with an increased distance away from the entrance of light into the image revealing medium 120. Also, as mentioned above, the scattering efficiency scales with the $4^{th}$ power of the frequency, so if multiple wavelengths are to be combined in the display of the three-dimensional image, a composition of the image revealing medium may be adjusted to intensity of different wavelengths for improving image quality.

According to another embodiment, the algorithm for calculating the three-dimensional light field may correct for the exponential decay in the image revealing medium 120, when the three-dimensional light field to be formed is calculated. The algorithm may use exponential increase of the intensity for each voxel with increasing distance from the entrance of light into the image revealing medium 120. This may add to complexity of the algorithm for calculating the three-dimensional light field. However, there may not be any need of complex arrangements or control of the image revealing medium 120 in the container 130.

Figure 5:
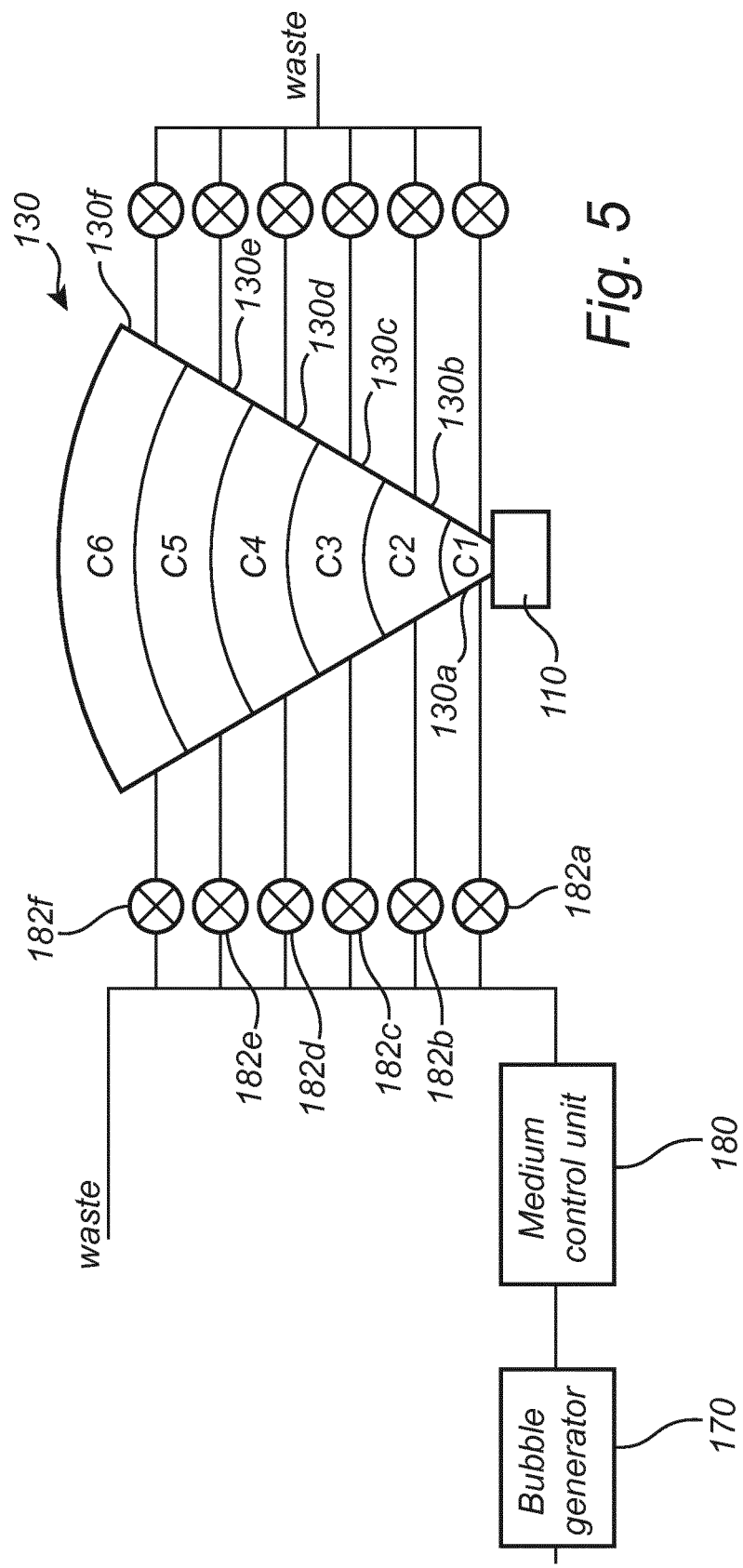
FIG. 5 is a schematic view of control of the image revealing medium in an apparatus comprising a container with a plurality of compartments according to a first embodiment.

As illustrated in FIG. 5, local control of the image revealing medium 120 may be provided by a medium control unit 180. The medium control unit 180 may be connected to the bubble generating device 170 (or alternatively to a particle supply).

It should be realized that the embodiments illustrated in FIGS. 5-6 and discussed below may be combined, as understood by a person skilled in the art, with one or more of the features described above in relation to FIGS. 1-4 and are merely omitted here for brevity.

Further, the container 130 is illustrated in FIGS. 5-6 with compartments 130a-f defined by opposing walls of partial envelopes of spheres such that a size of the compartment 130a-f increases with distance from position of entrance of light into the image revealing medium 120. It should be realized that such a shape of the container 130 may also be used with the embodiments described above in relation to FIGS. 1-4. It should also be realized that other shapes of the container 130 may be used in any of the embodiments, such as a container 130 having a cylindrical shape.

The light field generating unit 110 (only generally indicated in FIGS. 5-6) may be configured to generate light that is projected into the container 130 through a bottom surface of a first compartment 130a so as to propagate through the first compartment 130a to reach a second compartment 130b and so forth through all the compartments 130a-f. The light field generating unit 110 may thus generate a three-dimensional light field in the compartments 130a-f, which may be used for revealing a holographic image by the image revealing medium in the compartments 130a-f.

The medium control unit 180 may comprise a filter and mixing system for controlling concentration and/or size of bubbles or particles in the image revealing medium 120. The medium control unit 180 may thus control properties of the image revealing medium 120 output from the filter and mixing system. As illustrated in FIG. 5, a plurality of valves 182a-f may be used for controlling inlet of the image revealing medium 120 to the respective compartments 130a-f in the container 130. Also, as illustrated in FIG. 5, the compartments 130a-f may be provided with outlet channels, controlled by further valves, for enabling emptying of the respective compartments 130a-f. The image revealing medium 120 emptied from the compartments 130a-f may be transported to a waste.

Optical properties of the image revealing medium 120 may be monitored in the medium control unit 180 to ensure that desired optical attenuation constant and scattering properties of the image revealing medium 120 for a target compartment 130a-f is achieved. Once target specifications are achieved, the appropriate valve 182a-f may be opened for providing the image revealing medium 120 into the selected compartment 130a-f.

Each compartment 130a-f may also be provided with a separate calibration sensor 160 for monitoring the optical attenuation constant of the image revealing medium 120. The measurement result from the calibration sensor 160 may thus be provided to the medium control unit 180 during filling of the respective compartment 130a-f in order to ensure that the image revealing medium 120 in each compartment 130a-f meets target specification. The measurement result from the calibration sensors 160 in each compartment 130a-f may also or alternatively be used as input for the controller 150 for controlling three-dimensional light field to be formed and/or intensity of light to be received by the image revealing medium 120.

As further illustrated in FIG. 6, the local control of the image revealing medium 120 in a plurality of compartments 130a-f may be combined with an active control of the image revealing medium 120.

Thus, each compartment 130a-f may be associated with a flow control system for circulating the image revealing medium 120 through the respective compartments 130a-f. Further, the medium control unit 180 may then dynamically control a property of the image revealing medium 120 in each of the compartments 130a-f, such that properties may be differently changed in different compartments 130a-f.

The medium control unit 180 may further receive measurement results from calibration sensors 160 in each of the compartments 130a-f, so as to enable control of the image revealing medium 120 in each compartment 130a-f to be based on measured properties of the image revealing medium 120 in the respective compartment 130a-f.

This implies that accurate control of the image revealing medium 120 in the container 130 may be provided, with dynamic control of characteristics in different parts of the container 130. Thus, active and local control of the image revealing medium 120 may ensure that the apparatus 100 is able to continuously display three-dimensional images of high quality and may also enable to quickly adjust image revealing characteristics of the apparatus 100 to fit different three-dimensional images to be displayed.

In the above the inventive concept has mainly been described with reference to a limited number of examples. However, as is readily appreciated by a person skilled in the art, other examples than the ones disclosed above are equally possible within the scope of the inventive concept, as defined by the appended claims.

In the above description, the image revealing medium 120 has mainly been described in terms of comprising water and air bubbles or polystyrene particles suspended in water.

It should be realized that the image revealing medium 120 may be formed based on other fluids and other gases in the bubbles or other particle materials. In particular, if similar refraction index contrasts are used, the image revealing medium 120 may be expected to provide similar characteristics.

In particular, it should be realized that the fluid may be any aqueous liquid, such as water which may be provided with surfactants or electrolytic solutions, which may be helpful in providing long-term stability of bubbles in the fluid.

Further, the fluid may be saturated with the gas used in generation of the bubbles in the image revealing medium 120. This may further improve long-term stability of the bubbles in the fluid.

Further, the bubbles may be filled with any type of gas being relatively transparent. For example, the bubbles may be filled with a gas comprising oxygen, nitrogen or carbon dioxide or combinations thereof, as such gases may be easily available and may only involve non-hazardous substances.

It should also be realized that particles may be formed in any other material having appropriate refractive index and which may be formed into small beads of the desired size.

Thus, another plastic material may be used or even another material, such as silica. Silica particles would have a smaller refractive index (approximately 1.45) than the polystyrene particles discussed above, which implies that a higher concentration of particles would need to be used in the image revealing medium to obtain the same scattering properties.

The invention claimed is:

1. An apparatus for displaying a three-dimensional image, said apparatus comprising:
   a light field generating unit, which is configured to receive an incident light beam and generate a three-dimensional light field; and
   an image revealing medium, which is arranged to receive the three-dimensional light field generated by the light field generating unit, wherein the image revealing medium comprises a fluid with bubbles or particles suspended in the fluid, wherein the bubbles or particles have a size in the range of 40-500 nm,
   wherein the bubbles or particles cause scattering of light based on at least one of Tyndall scattering or Rayleigh scattering for forming the three-dimensional image.

2. The apparatus according to claim 1, wherein the bubbles or particles have a size in the range of 40-200 nm.

3. The apparatus according to claim 1, wherein the bubbles or particles have a size in the range of 50-150 nm.

4. The apparatus according to claim 1, wherein the fluid is an aqueous liquid.

5. The apparatus according to claim 1, wherein the bubbles are filled with air or another gas comprising oxygen, nitrogen or carbon dioxide.

6. The apparatus according to claim 1, wherein a size of the bubbles or particles and a concentration of bubbles or particles in the fluid are selected for providing an optical attenuation constant in the range of 10-200 dB/m for a wavelength of light of the light beam.

7. The apparatus according to claim 1, wherein a size of the bubbles or particles and a concentration of bubbles or particles in the fluid are selected for providing an average distance between two adjacent bubbles or particles in the fluid below 200 μm.

8. The apparatus according to claim 1, wherein a concentration of bubbles in the fluid is larger than $2*10^{14}$ bubbles/$m^3$.

9. The apparatus according to claim 1, further comprising a container in which the image revealing medium is arranged, wherein at least a portion of a wall of the container is transparent for output of light scattered by the bubbles or particles in the fluid.

10. The apparatus according to claim 9, further comprising at least one channel connected to the container for transporting the image revealing medium into and out of the container.

11. The apparatus according to claim 9, wherein the image revealing medium is arranged in the container to have an increasing concentration of bubbles or particles in a direction of propagation of light of the generated light field in the container.

12. The apparatus according to claim 1, further comprising at least one calibration sensor, which is configured to receive light being transmitted through the image revealing medium for detecting an intensity of received light as a measure of attenuation of a light beam propagating through the image revealing medium.

13. The apparatus according to claim 1, further comprising an optical system for transferring the light field generated by the light field generating unit into the image revealing medium.

14. The apparatus according to claim 1, further comprising a controller unit for controlling the light field generating unit for controlling distribution of light in the three-dimensional light field output by the light field generating unit.

15. The apparatus according to claim 1, further comprising at least one light source, which is configured to generate the light beam incident on the light field generating unit.

16. The apparatus according to claim 1, wherein the light field generating unit comprises a plurality of cells, wherein each cell is configured to interact with a portion of an incident light beam in order to provide interaction with the portion of the incident light beam for forming the three-dimensional light field.

17. An apparatus for displaying a three-dimensional image, said apparatus comprising:
   a light field generating unit, which is configured to receive an incident light beam and generate a three-dimensional light field; and
   an image revealing medium, which is arranged to receive the three-dimensional light field generated by the light field generating unit, wherein the image revealing medium comprises a fluid with bubbles suspended in the fluid, wherein the bubbles have a size in the range of 40-500 nm.

* * * * *